United States Patent
Papadopoulos et al.

(10) Patent No.: US 10,536,249 B2
(45) Date of Patent: Jan. 14, 2020

(54) UPLINK PILOT REUSE AND USER-PROXIMITY DETECTION IN WIRELESS NETWORKS

(71) Applicant: NTT DOCOMO, INC., Tokyo (JP)

(72) Inventors: Haralabos Papadopoulos, Palo Alto, CA (US); Ozgun Bursalioglu Yilmaz, Palo Alto, CA (US); Chenwei Wang, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 76 days.

(21) Appl. No.: 15/767,582

(22) PCT Filed: Oct. 14, 2016

(86) PCT No.: PCT/US2016/057192
§ 371 (c)(1),
(2) Date: Apr. 11, 2018

(87) PCT Pub. No.: WO2017/066681
PCT Pub. Date: Apr. 20, 2017

(65) Prior Publication Data
US 2018/0309549 A1    Oct. 25, 2018

Related U.S. Application Data

(60) Provisional application No. 62/242,237, filed on Oct. 15, 2015.

(51) Int. Cl.
*H04L 5/00*     (2006.01)
*H04W 4/02*     (2018.01)
(Continued)

(52) U.S. Cl.
CPC ............. *H04L 5/005* (2013.01); *H04W 4/023* (2013.01); *H04W 4/06* (2013.01); *H04W 8/22* (2013.01);
(Continued)

(58) Field of Classification Search
None
See application file for complete search history.

(56) References Cited

U.S. PATENT DOCUMENTS

2011/0249597 A1   10/2011   Papadopoulos
2015/0092699 A1    4/2015   Chen et al.
(Continued)

OTHER PUBLICATIONS

Korean IP Office, International Search Report of the International Searching Authority, dated Jan. 16, 2017 for International Application No. PCT/US2016/057192 (4 pgs).
(Continued)

*Primary Examiner* — Mohammad S Adhami
(74) *Attorney, Agent, or Firm* — Womble Bond Dickinson (US) LLP

(57) ABSTRACT

A method and apparatus is disclosed herein for uplink pilot reuse and user-proximity detection in wireless networks. In one embodiment, a wireless system is disclosed for use in a wireless network having a plurality of user terminals (UTs), where at least two UTs of the plurality of UTs have pre-assigned user uplink pilot codes and are allocated common pilot resources over at least two concurrent slots, the system comprising a UT-proximity detection processor to determine which UT channels the UT-proximity detection processor can resolve among a group of UTs transmitting pilots in identical pilot resources, the UT-proximity detection processor operable to resolve a UT channel of a UT by determining the UT is in proximity of the system and no other UT in the group of UTs transmitting pilots that has transmitted a pilot on the identical pilot resources is in proximity of the system.

31 Claims, 10 Drawing Sheets

(51) Int. Cl.
  *H04W 4/06* (2009.01)
  *H04W 8/22* (2009.01)
  *H04W 64/00* (2009.01)
  *H04W 72/04* (2009.01)

(52) U.S. Cl.
  CPC ....... *H04W 64/003* (2013.01); *H04W 72/048* (2013.01)

(56) References Cited

U.S. PATENT DOCUMENTS

| | | | |
|---|---|---|---|
| 2015/0381327 A1* | 12/2015 | Ashikhmin | H04B 7/0452 370/329 |
| 2016/0285604 A1* | 9/2016 | Larsson | H04B 7/0413 |
| 2017/0104561 A1* | 4/2017 | Agardh | H04L 5/0023 |
| 2018/0175960 A1* | 6/2018 | Fodor | H04B 7/024 |
| 2018/0183506 A1* | 6/2018 | Hessler | H04B 7/0452 |

OTHER PUBLICATIONS

Korean IP Office, Written Opinion of the International Searching Authority, dated Jan. 16, 2017 for International Application No. PCT/US2016/057192 (6 pgs).

Lu Lu, et al., "An Overview of Massive MIMO: Benefits and Challenges," IEEE Journal of Selected Topics in Signal Processing, vol. 8, No. 5, Oct. 1, 2014, pp. 742-758; ISSN: 1932-4553.

Yang, Li, et al., "A non-asymptotic throughput for massive MIMO cellular uplink with pilot reuse," IEEE GLOBECOM 2012, Dec. 3, 2012, pp. 4500-4504; ISBN: 978-1-4673-0920-2.

PCT Application No. PCT/US2016/057192, Notification Concerning Transmittal of International Preliminary Report on Patentability, dated Apr. 26, 2018, 8 pgs.

Yang Li et al:"A non-asymtotic throughput for massive MIMO cellular uplink with pilot reuse", IEEE GLOBECOM 2012, Dec. 3, 2012 (Dec. 3, 2012), pp. 4500-4504, XP032375384.

* cited by examiner

|  | UE 200-1 | UE 200-2 | UE 200-3 | UE 200-4 | UE 200-5 |
|---|---|---|---|---|---|
| RB 1 Port | 0 | 1 | 1 | 1 | 1 |
| RB 2 Port | 1 | 0 | 1 | 1 | 1 |
| RB 3 Port | 1 | 1 | 0 | 1 | 1 |
| RB 4 Port | 1 | 1 | 1 | 0 | 1 |
| RB 5 Port | 1 | 1 | 1 | 1 | 0 |

|  | UE 1 00 | UE 2 01 | UE 3 02 | UE 4 10 | UE 5 11 | UE 6 12 |
|---|---|---|---|---|---|---|
| Port 0x | 0 | 0 | 0 | 1 | 1 | 1 |
| Port 1x | 1 | 1 | 1 | 0 | 0 | 0 |
| Port x0 | 0 | 1 | 1 | 0 | 1 | 1 |
| Port x1 | 1 | 0 | 1 | 1 | 0 | 1 |
| Port: x2 | 1 | 1 | 0 | 1 | 1 | 0 |

| N | m | Maximum L | Efficiency |
|---|---|---|---|
| 6 | 1 | 6 | 5/6 |
|  | 2 | 15 | 2/3 |
|  | N/2 | 20 | 1/2 |
| 12 | 1 | 12 | 11/12 |
|  | 2 | 66 | 5/6 |
|  | 3 | 220 | 3/4 |
|  | 4 | 495 | 2/3 |
|  | N/2 | 924 | 1/2 | under 35 U.S.C. § 371 of International Application No. PCT/US2016/057192, filed Oct. 14, 2016, entitled UPLINK PILOT REUSE AND USER-PROXIMITY DETECTION IN WIRELESS NETWORKS, which claims priority to and incorporates by reference the corresponding U.S. provisional patent application No. 62/242,237, entitled, "Method and Apparatus for Aggressive Uplink Pilot Reuse and Fast User-Proximity Detection in Dense Wireless Networks," filed on Oct. 15, 2015.

UPLINK PILOT REUSE AND USER-PROXIMITY DETECTION IN WIRELESS NETWORKS

CROSS-REFERENCE TO RELATED APPLICATIONS

This patent application is a U.S. National Phase application under 35 U.S.C. § 371 of International Application No. PCT/US2016/057192, filed Oct. 14, 2016, entitled UPLINK PILOT REUSE AND USER-PROXIMITY DETECTION IN WIRELESS NETWORKS, which claims priority to and incorporates by reference the corresponding U.S. provisional patent application No. 62/242,237, entitled, "Method and Apparatus for Aggressive Uplink Pilot Reuse and Fast User-Proximity Detection in Dense Wireless Networks," filed on Oct. 15, 2015.

FIELD OF THE INVENTION

Embodiments of the present invention relate to the field of wireless communication; more particularly, embodiments of the present invention relate to pilot reuse and proximity detection in wireless networks.

BACKGROUND OF THE INVENTION

Dense cellular network deployments relying on the use of Massive MIMO technology are becoming very attractive candidates for future radio access technologies. This is partly due to the promise of Massive MIMO for providing very large throughput increases per BS, due to its ability to multiplex a large number of high-rate streams over each transmission resource element.

It is well accepted by now that major gains in the PHY layer in terms of throughput per unit area are to come from the judicious use of dense infrastructure antenna deployments, comprising of a dense network of small cells, possibly equipped with large antenna arrays. Indeed, Massive MIMO is very attractive when it is used over dense (small cell) deployments, as, in principle, it can translate to massive throughput increases per unit area with respect to existing deployments.

Massive MIMO is also envisioned as a candidate for addressing large variations in user load, including effectively serving user-traffic hotspots spots, such as e.g., malls or overcrowded squares. A deployment option that is considered attractive (especially) for serving user-traffic hots involves remote radio-head (RRH) systems in which a BS controls a massive set of antennas that are distributed over many locations. Current proposals for RRH systems consider only one or at most a few antennas per RRH unit. However, with bandwidth expected to become available at higher frequency bands (including in the mmWave band), it will become possible to space antenna elements far closer to one another and consider RRHs with possibly a large number of antennas per RRH unit. In principle, this would allow the network to simultaneously harvest densification and large-antenna array benefits thereby delivering large spectral efficiencies per unit area.

Channel state information (CSI) between each BS antenna and the user terminals is required in order to be able to serve multiple streams over the same transmission resources. CSI is obtained by the use of training pilots. A pilot is transmitted by one antenna and received by another in order to learn the channel between the two antennas. With massive arrays at the BS side, the preferred option for training (in terms of its training overhead) is to train in the uplink, as one pilot from a user terminal (UT) antenna trains all the antennas at nearby BS sites, no matter how many sites and antennas per site. This is true not only for transmitting data in the uplink but also for downlink transmission. By using UL training and exploiting uplink-downlink radio channel reciprocity, "Massive MIMO" rates can be achieved in the DL, provided UL training and DL massive MIMO data transmission are within the coherence time and bandwidth of the wireless propagation channel.

Furthermore, reciprocity based training inherently enables coordinated multipoint (CoMP) transmission, including RRH-based transmission. Indeed, inherently, a single pilot broadcast from a user terminal antenna trains all the antennas at all nearby BS sites that it can be received at sufficiently high power. It is well known that in cellular networks such CoMP transmission is beneficial for users at the cell edge, i.e., for users that receive equally strong signals from more than one BS. Similar performance gains are expected in RRH systems. Inherently, a user can obtain beamforming gains during the data transmission phase from all the RRH unit-antenna combinations that receive the user's pilot broadcast at sufficiently high power.

An important challenge that arises in harvesting densification benefits with cellular networks arises from the fact that UL pilot resources must be reused over the network. It is desirable to make the reuse distance of a pilot resource as small as possible in order to maximize the densification benefits and the delivered network spectral efficiency (and throughput) per unit area. Indeed, if the same pilot resource could be effectively reused by two close-by users, this would allow serving these two close-by users in parallel by the network. However, the users would have to be significantly separated (geographically), so that their simultaneously broadcasted pilots are received by their serving base-stations at sufficiently high powers, but at sufficiently low powers at each other user's BSs. This implies that there is a minimum reuse distance for a users' UL pilot that has to be honored so that users using the same pilot have to be significantly geographically separated to not cause interference to each other's BS.

A similar issue limits the throughputs per unit area achievable by RRH's. Indeed, it is conventionally assumed that a pilot resource is used by a single RRH (active) user. This limits the possible multiplexing gains offered by the RRH to serving a single user.

To achieve large cell throughputs and (especially) large cell-edge throughputs over well-planned macro-cellular networks with simplified scheduling and precoding operation, it is advocated that a reuse-7 operation is used. It is easy to show that in such a massive MIMO network, the advocated operation is effectively equivalent to a reuse-1 operation with pilot-reuse 7, whereby the pilots are split into 7 subsets and each subset is reused every 7-th cell.

There has been a proposal for a pilot reuse extension of this approach over heterogeneous networks comprising of well-planned macro-cells and small cells. In particular, pilot dimensions are split between macros and small cells. Furthermore the individual tier pilot resources are reused with a given pilot reuse factor. For example, the small cell BSs are colored with a finite set of colors, so that no small cell has a same-color neighbor. The pilot reuse factor in this case corresponds to the number of used colors. Although, in theory this results in a minimum pilot-reuse of 4, as the minimum number of needed colors is 4, in practice, larger number of colors (and thus larger pilot reuse factors) are required.

A geographic scheduling approach has been discussed, according to which, in each scheduling slot users at similar locations (relative to their serving cell) are scheduled for transmission across the network. This allows optimizing the precoder, multiplexing gains and the pilot reuse independently per geographic location, i.e., independently for cell-center and cell-edge users. With this operation, substantial gains with respect in terms of cell and cell-edge throughput (as well as in terms of the number of antennas needed to achieve a certain level of performance). However, this approach relies on a well-planned macro-cellular network with dense user traffic so that geographic scheduling and optimization are possible. As a result this approach cannot be directly used in unplanned small cell deployments.

Clearly, as higher band frequencies become available and wireless network become increasingly densified, there is a need for methods that allow translating antenna/site-densification into gains in spectral-efficiency per unit area. Although, for a well-planned macro-cellular network, this may be achieved (in this case the antenna sites remain fixed and the number of antennas per site is increased), achieving similar gains with network densification (e.g., in cases where both the number of antennas/site and the number of sites also increase) is not possible with the current state of the art methods.

SUMMARY OF THE INVENTION

A method and apparatus is disclosed herein for uplink pilot reuse and user-proximity detection in wireless networks. In one embodiment, a wireless system is disclosed for use in a wireless network having a plurality of user terminals (UTs), where at least two UTs of the plurality of UTs have pre-assigned user uplink pilot codes and are allocated common pilot resources over at least two concurrent slots, the system comprising a UT-proximity detection processor to determine, which UT channels the UT-proximity detection processor can resolve among a group of UTs transmitting pilots in identical pilot resources, the UT-proximity detection processor operable to resolve a UT channel of a UT by determining the UT is in proximity of the system and no other UT in the group of UTs transmitting pilots that has transmitted a pilot on the identical pilot resources is in proximity of the system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figures 1, 2:
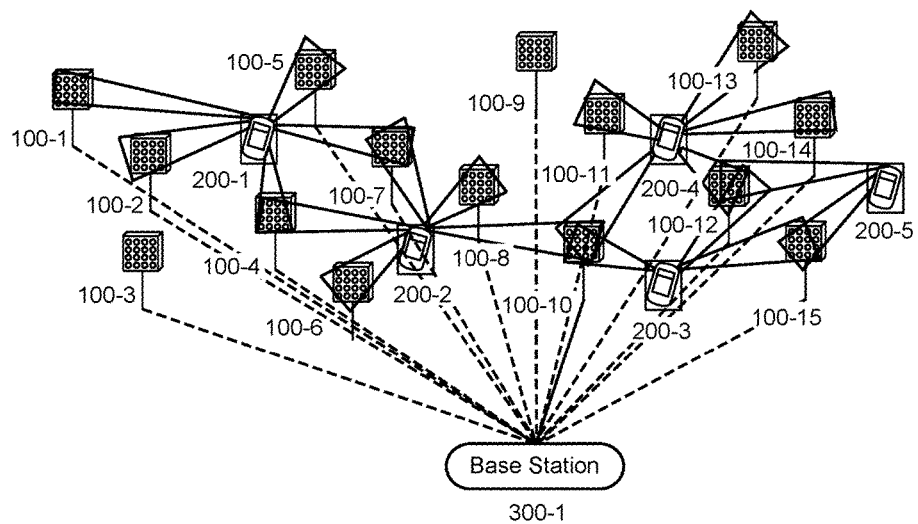
FIG. 1 illustrates an example of a user-proximity detection pilot code over a number of concurrent slots (using one port/pilot dimension per slot).
FIG. 2 illustrates one embodiment of a RRH system serving users on the 1st dimension of a set of concurrent pilots using the code of FIG. 1.

Methods and apparatuses that allow for a much more aggressive pilot reuse in cellular, RRH or other wireless systems in way that this aggressive pilot reuse translates into densification (throughput/unit area) gains are described. According to one embodiment, many potentially closely located users transmit appropriately coded pilots over the same transmission resources allocated for uplink pilot transmission. In the context of an RRH system, in one embodiment, certain user-specific pilot codes allow each RRH unit to determine whether the subset of transmitting active users (over a common uplink-pilot resource set) whose pilots are received at sufficiently high level comprises a single user, multiple users or no users. In the description of this invention, we refer to RRH sites and RHH units interchangeably, although, strictly speaking there may be multiple RRH units on a single site. In one embodiment, the RRH unit determines which user channels it can resolve among a group of users transmitting pilots in identical pilot resources. In one embodiment, the RRH unit resolves a user channel of a user by determining the user is in proximity of the system and no other user in the group of users transmitting pilots that has transmitted a pilot on the identical pilot resources is in proximity of the system.

In the case that the RRH unit determines that only a single user is received at sufficiently high level, the RRH unit also identifies the identity of the active user and estimates its channel. By having the same coded packet available for transmission at each RRH unit, and by having each individual RRH unit transmit a user packet only when a single user is identified nearby (based on pilot code based user proximity detection), significant densification benefits can be harvested. Similar benefits can be harvested in dense small cell deployments, by pushing the same coded packet per user to all nearby small cell BSs, and having a small cell transmit a user packet only when the single-user is identified.

In one embodiment, the disclosed methods and apparatuses allow for increasing the network spectral efficiency per unit area in dense antenna/antenna-site network deployments. In one embodiment, this is accomplished by the combined use of appropriately designed pilot codes for use in the uplink by active (scheduled) user terminals, and use of mechanisms for fast user detection at each antenna-site by the network.

Note that the terms "user terminal", "user equipment" and "user" are used interchangeably throughout the specification to refer to a device used by an end user to access the services provided by a wireless network communication system.

Embodiments are disclosed involving remote radio head (RRH) units (or other wireless systems) in which the base-station controlling the transmission of the RRH units is able to serve a number of user terminals potentially much larger than the number of dimensions allocated for uplink pilots per scheduling slot. In particular, techniques are disclosed in which many users are assigned to transmit training pilots over the same transmission resources. By scheduling transmissions over a set of concurrent resource blocks or slots, and by using appropriate coding of the pilots transmitted by the users transmitting over the common pilot resources, the disclosed techniques allow each RRH unit to detect a user terminal in proximity to it, when a single user terminal out of those assigned the same pilot resources is in the proximity of the RRH unit. By ensuring that a common user-specific slot-specific coded packet is available for transmission at each RRH unit, an active user is served if at least one RRH unit detects this user terminal to be the single active user terminal (among those active on the same set of pilot resources) in its proximity.

Although the disclosed techniques may be described in the context of a single RRH system, in which the remote radio heads are distributed over many different sites, the disclosed techniques can be readily applied in other related scenarios. For instance, they can also be applied over small cell networks and can offer significant improvements in network spectral-efficiency (and throughput) per unit area when serving mobile users. The simplest such embodiment considers synchronized (and jointly RF calibrated) small cells that have available a common packet per user per slot. Each BS can transmit the packet when it detects the user as the only active user in its proximity among the all active users that have transmitted uplink pilots over the given transmission resources. In another embodiment, an additional step of choosing for each detected user one of the base stations that detected the user to send the data to the user is used. This embodiment does not require synchronization or joint RF calibration of nearby base stations.

Embodiments of the invention have one or more of the following advantages with respect to the state-of-the-art network densification approaches:

1) Embodiments of the invention allow a substantial increase in the spectral efficiency (and throughput) per unit area in hot spot areas by use of remote radio head (RRH) units, aggressive pilot reuse and fast (sub ms) user-proximity detection.
2) Embodiments of the invention rely on the use of CoMP transmission, referred to herein as distributed MIMO, that requires user-data synchronization across different RRH units, but does not require channel state information exchange between BSs.
3) Embodiments of the invention rely on having users broadcast coordinated pilots over a set of concurrent resource blocks to assist in detection of the users in the proximity of a base station.
4) In one embodiment, the RRHs exploit spatial filtering (generalization of sectorization) together with user proximity to improve single-user proximity detection.
5) Embodiments of the invention allow a substantial increase in the spectral efficiency (and throughput) per unit area in serving mobile users by use of a network of large-scale MIMO small cells. In one embodiment, CoMP transmission, referred to as distributed MIMO, is used and requires user-data synchronization across different RRH units, but does not require channel state information exchange between BSs. In another embodiment, fast coordination between nearby BSs is used to choose a single BS for serving a user among the ones that detected the user in their proximity.
6) In one embodiment, the disclosed pilot-code based user-proximity detection is also combined with a broad range of channel estimation algorithms based on uplink pilot transmission to allow enhancing the multiplexing gains achieved in a variety of wireless transmission scenarios over a broad range of carrier frequencies. In one embodiment, involving cellular transmission over mmWave channels, pilot codes can be combined with pseudorandom pilot allocation over the OFDM plane and compressed sensing and channel estimation. Disclosed methods yield significant multiplexing gains in the number of users that can be served simultaneously by the RRH system, realizing at the same time compressed-sensing gains in terms of the savings in the number of training dimensions per user that are required to estimate the channel of each user in proximity of an RRH unit.

One or more embodiments of the invention include the following:

1) Protocols for uplink pilot transmission over a set of concurrent transmission resource blocks (or scheduling slots).
2) Mechanisms for immediate detection at each BS or RRH unit of the event that a single user is in proximity among the users transmitting pilots over a common pilot dimension over a set of concurrent resource blocks.
3) Mechanisms for immediate user identification at each BS or RRH unit when a single user has been detected in proximity among the users transmitting pilots over a common set of pilot dimensions over a set of concurrent resource blocks.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Downlink MU-MIMO and CSI and Rate Calculations for Massive MIMO

The text that follows provides a brief description of the general area of downlink MU-MIMO, and methods for obtaining the required channel state information at the transmitter, and rate calculations for Massive MIMO.

Conventional downlink MU-MIMO schemes have been at the forefront of investigations in the past decade. These schemes promise spectral efficiency increases by using multiple antennas at the base-station and serving multiple users simultaneously without the need for multiple antennas at the user terminals. This is achieved by using knowledge of the channel state information (CSI) between each user and the transmitting base-station. Having CSIT (CSI available at the transmitter) allows the transmitter to precode the user streams so that each user terminal (UT) sees only its own stream. Given a base station with M transmit antennas, K single-antenna user terminals can be served simultaneously, giving roughly a multiplexing gain equal to min(M,K) with respect to a system serving a single terminal. In Massive MIMO, the number of antennas serving users is much larger than number of users being served. In downlink Massive MIMO, for instance, many users can be served at the same time either using linear zero-forced beamforming (LZFBF), or even the simpler Conjugate Beam Forming (CBF), exploiting the fact that the number of users served is far smaller than the number of antennas. As the number of antennas gets large, transmission beams get sharper, thereby achieving the desired received signal level with much lower transmitted power levels. Furthermore, with large antenna arrays, the achieved user rates harden, i.e. variance in user rate due to fast (e.g., Rayleigh) fading becomes effectively negligible.

For the transmitter to achieve this operation reliably the transmitter needs to have sufficiently accurate CSIT, i.e., the transmitter needs to know the channels between itself and each of the users sufficiently accurately. The techniques used for acquiring CSIT fall into two categories. The first class employs M pilots (one per base-station transmit antenna) in the downlink to allow each user terminal to estimate the channel coefficients between the user-terminal's own antenna(s) and those of the base-station. This operation provides each CSI at each receiving user-terminal (CSIR) regarding the channel between each base-station transmit antenna and the user-terminal receive antennas. The CSIR, i.e., the CSI information available at each user-terminal, is then fed back to the transmitter by use of uplink transmissions to provide CSIT, i.e., CSI at the transmitting base-station. This class of CSIT acquisition schemes have two overheads: (i) a downlink pilot overhead, which scales linearly with M (the number of antenna elements at the transmitting base-station); (b) an uplink feedback overhead, responsible for making available to the base-station the channels between each user-terminal and each base-station antenna. In the case each user terminal has a single antenna, the uplink feedback is responsible for providing to the base-station the MK channel coefficients (complex-scalar numbers), one coefficient for each channel between each user terminal antenna and each base-station antenna. Although the uplink overhead could in principle be made to grow linearly with min(M,K), with the methods used in practice this overhead grows as the product of M and K. The downlink overhead limits the size of the antenna array, M, that can be deployed. Similarly, the uplink overheads limit both M and K, as the overheads grow very fast with respect to increasing M and K.

The second class of CSIT acquisition techniques is referred to as reciprocity-based training schemes. They exploit a property of the physical wireless channel, known as channel reciprocity to enable, under certain suitably chosen (M,K) pairs, very high-rate transmission with very efficient CSIT training. In particular, pilots are transmitted in the uplink by each user (K pilots are needed, but more could be used) and the corresponding pilot observations at the base-station are directly used to form the precoder for downlink transmission. If the uplink training and the following downlink data transmission happen close enough in time and frequency (within the coherence time and the coherence bandwidth of the channel), then the uplink training provides directly the required (downlink channel) CSI at the transmitter, since the uplink and the downlink channels at the same time and frequency are the same. In this class of techniques, the uplink overheads scale linearly with K, i.e., with the number of user terminals that will be served simultaneously. These schemes are also typically envisioned as relying on TDD (Time Division Duplex) in order to allow uplink training and downlink transmission within the coherence bandwidth of the user terminal channel with a single transceiver shared for uplink and downlink data transmission.

One attractive aspect of reciprocity-based training schemes is that one can keep on increasing the size of the transmit antenna array, M, making it "Massive", without incurring any increase in the training overheads. Although with M>K, increasing M does not increase the number of simultaneously multiplexed streams, K, (i.e., K streams are simultaneously transmitted, one to each user), increasing M induces significant "beamforming" gains on each stream (which translate to higher rate per stream), at no additional cost in training. Alternatively, increasing M allows reducing the transmit power required to yield a target rate to a user terminal, thereby allowing for greener transmission schemes.

Reciprocity-Based Massive MU-MIMO

Consider the problem of enabling MU-MIMO transmission from an array of M transmit antennas to U single-antenna user terminals. The downlink (DL) channel between the i-th base-station transmitting antenna and the k-th user terminal is given by $$\vec{y}_{ki} = \vec{h}_{ki}\vec{x}_i + \vec{z}_{ki}$$

where $\vec{x}_i$, $\vec{h}_{ki}$, $\vec{y}_{ki}$, $\vec{z}_{ki}$, denote the transmitted signal from base-station antenna i, the compound DL channel between the two antennas, the observation and noise at the receiver of user terminal k, respectively. This model is applicable at any resource block. In general, the variables in the above equation are resource-block dependent. This dependency is currently ignored in the notation for convenience though with an abuse of notation, it will be used when time-sharing across various resource blocks are considered. The amplitude and phase shifts introduced by RF-to-baseband conversion hardware (e.g., gain control, filters, mixers, A/D, etc.) at the receiver of user terminal k as well as the amplitude and phase shifts introduced by the baseband-to-RF conversion hardware (e.g., amplifiers filters, mixers, A/D, etc.) at the transmitter generating the signal to be transmitted by base-station antenna i are all included in the DL compound channel.

Similarly the uplink channel between the k-th user terminal and the i-th base-station antenna is given by $$\overleftarrow{y}_{ik} = \overleftarrow{h}_{ik}\overleftarrow{x}_k + \overleftarrow{z}_{ik}$$

where $\overleftarrow{x}_k$, $\overleftarrow{h}_{ik}$, $\overleftarrow{y}_{ik}$, $\overleftarrow{z}_{ik}$, denote the transmitted signal from user terminal k, the compound uplink (UL) channel between the two antennas, the observation and noise at the receiver of base-station antenna i, respectively. The amplitude and phase shifts introduced by RF-to-baseband conversion hardware (e.g., gain control, filters, mixers, A/D, etc.) at the receiver of base-station antenna i as well as the scalar (complex) coefficient $\overleftarrow{t}_k$ contains the amplitude and phase shifts introduced by the baseband-to-RF conversion hardware (e.g., amplifiers filters, mixers, A/D, etc.) at the transmitter generating the signal to be transmitted by user terminal k are all included in the compound UL channel.

In the uplink, the following model may be used:

$$\overleftarrow{y} = \overleftarrow{H}\overleftarrow{x} + \overleftarrow{z}$$

where $\overleftarrow{x}$ is the vector of dimension K×1 (i.e., K rows by 1 column) comprising the user symbols on subcarrier n at symbol time t, $\overleftarrow{H}$ is the M×U channel matrix that includes the constant carrier phase shifts and the frequency-dependent constant in time phase shifts due to the relative delays between the timing references of the different terminals, $\overleftarrow{y}$ and $\overleftarrow{z}$ are the received signal vector and noise at the user terminal.

In the downlink, the following model may be used:

$$\vec{y} = \vec{x}\vec{H} + \vec{z}$$

where $\vec{x}$ is the (row) vector of user symbols on subcarrier n at symbol time t, $\vec{H}$ is the U×M channel matrix that includes the constant carrier phase shifts and the frequency-dependent constant in time phase shifts due to the relative delays between the timing references of the different terminals, $\vec{y}$ and $\vec{z}$ are the received signal (row) vector and noise at the user terminals. Other BSs at sufficiently close distance cause interference as Network MIMO/joint transmission/CoMP or any other interference mitigation techniques are not considered. Interference from the other access points is included in the noise term.

Assuming perfect calibration, the compound UL and DL channels become reciprocal, so that $$\overleftarrow{H} = \vec{H}$$

For simplicity, the thermal noise is neglected. In order to estimate the downlink channel matrix, the U user terminals send a block of U OFDM symbols, such that the uplink-training phase can be written as $$\overleftarrow{Y_{tr}} = \overleftarrow{H}\overleftarrow{X_{tr}} + \text{noise}$$

where $\overleftarrow{X_{tr}}$ is a scaled unitary matrix. Hence, the base-station can obtain the channel matrix estimate $$\overleftarrow{Y_{tr}}\overleftarrow{X_{tr}} = \overleftarrow{H} + \text{noise}$$

In order to perform downlink beamforming, the compound channel downlink matrix $\vec{H}$ is used. The ZFBF precoding matrix is calculated as $$W = \Lambda^{1/2}[\vec{H}^H \vec{H}]^{-1}\vec{H}^H$$

where $\Lambda$ is a diagonal matrix with $\lambda_m$'s as diagonal elements that imposes on each row of the matrix W, the row normalization $\|w_m\|^2 = 1$, for all m.

Hence, the LZFBF precoded signal in the downlink with equal power for each beam also taking account a distance-dependent pathloss model with the diagonal matrix G, whose diagonal elements are $g_i$'s.

$$\vec{y} = \vec{u}p^{1/2}G^{1/2}W\vec{H} + \vec{z}$$
$$= \vec{u}p^{1/2}G^{1/2}\Lambda^{1/2}[\vec{H}^H\vec{H}]^{-1}\vec{H}^H\vec{H} + \vec{z}$$
$$= \vec{u}p^{1/2}G^{1/2}\Lambda^{1/2} + \vec{z}$$

$$\lambda_k = \frac{1}{\left[\left(\vec{H}^H\vec{H}\right)^{-1}\right]_{k,k}}$$

Notice that the resulting channel matrix is diagonal, provided that S≤M.

MU-MIMO User Scheduling

Although there several methods available in the literature for scheduling multi-user MIMO transmissions at the BS, a widely accepted class of methods involves scheduling policies which, at any given scheduling instant at the BS, schedule the subset of users that would yield the highest expected weighted sum-rate. Each user's expected rate in each scheduled set for transmission is a function on the instantaneous channels of all the users in the scheduled set. Indeed, assuming LZFBF transmission as described in the preceding section, at any given resource block the coefficients $\lambda_k$'s depend on the instantaneous channel matrix of all users in the scheduling set (served by LZFBF), and in particular, they can be expressed as $$\lambda_{k,S}(t) = \frac{1}{\left[\left(\vec{H}_{k,S}^H(t)\vec{H}_{k,S}(t)\right)^{-1}\right]_{k,k}},$$

where $\vec{H}_{k,S}(t)$ denote the compound downlink channel matrix for UT-k in the user set S at the tth resource block. Clearly, since the choice of the user set S and/or resource block (t) affects $\lambda_k$, the expected user rates are a function of both the scheduling set and the instantaneous channel realization. Fixing the scheduling time instance, and assuming LZFBF transmission, the problem of choosing the subset S which maximize the weighted sum-rate is combinatorial in the number of antennas, as the number of possible subsets, S, that can be considered for scheduling grows exponentially fast with the maximum number of users that can be considered for joint scheduling.

Another important factor defining the scheduling assignments that are produced by the scheduling policy is the method by use of which the "user weights" are chosen at each scheduling instant prior to performing the weighted sum rate maximization operation. Although many methods exist for choosing these weights, a widely accepted class of methods (because of their ability to result in nearly optimal performance with respect to a fairness criterion belonging to a broad class of fairness criteria) is one that relies on the use of "virtual queues" to determine the instantaneous user-weights in the weight-sum rate optimization.

Massive MIMO arrays at the BSs of a cellular network can substantially simplify scheduler operation. In sharp contrast to conventional MIMO, in many cases the rate provided to an active (scheduled) user by its serving BS does not depend on the other active users in the same cell and in nearby cells and can be in fact predicted a priori. Such type of operation is exploited over macro-cellular Massive MIMO deployments to obtain large cell and cell-edge throughput gains with respect to their conventional MIMO counterparts. This rate-hardening approach can be extended to include operation over heterogeneous networks comprising of macro and small cells with Massive MIMO arrays. Near optimal association and load balancing can be achieved with simple user-BS association mechanisms and rudimentary round-robin schedulers at each base station.

Overview of Embodiments of the Invention

Embodiments of the invention include methods and apparatuses for fast (sub ms) user-proximity detection and identification based on uplink pilot transmission from a number of users sharing a common set of pilot dimensions over a set of concurrent resource blocks (or scheduling slots). In one embodiment, a pilot dimension refers to the set of resource elements on the OFDM plane that are made available to a single user for transmitting its uplink pilots during a scheduling slot. These resources (e.g., frequency and time resources) are a subset of all the pilot resources allocated over a concurrent set of resource blocks to transmit pilots in order for the BS to learn channels between its antenna array and user terminals over the time-frequency elements spanned by these resource blocks.

In one embodiment, the techniques described herein can be applied at each RRH unit of a RRH system serving a hot spot area and allows each RRH unit to determine which subset of user channels can be reliably estimated, and subsequently which user streams to transmit, including the beam on which to transmit each of these streams. By having available the same packet for any given user for potential transmission at different RRH units, each user terminal can be served, provided at least one of these RRH units is able to estimate the user channel and serve its packet. Embodiments of the invention rely on judiciously choosing: (a) the number of users that use a common set of pilot dimensions across a set of concurrent resource blocks; (b) the pilot patterns used by these users; (c) the mechanism for detecting whether multiple users have collided at an RRH unit, or a single user is in proximity of the RRH unit; (d) the mechanism to determine the identity of the active user in proximity at the RRH, provided a single user is detected to be in proximity of the RRH unit. As a result, densification can be achieved, in terms of increasing the number of users simultaneously served by the RRH unit on each set of pilot dimensions, translating in gains in spectral efficiencies achieved per unit area.

In one embodiment, the same techniques are applied over a network of small cells with large arrays to achieve large gains in spectral efficiency delivered per unit area to serving mobile users. In one embodiment, for a given user and resource block (slot), each BS has the same user-specific packet available for transmission and transmits it if it detects the associated active user is the only one in proximity among the ones transmitting on the same pilot dimension on the given slot. A variation of this involves fast coordination among nearby BSs that detect a given user (as the single user in proximity among the ones using a common set of pilot dimensions) in order to select a single BS to serve that user (among the BSs that detected the user).

Embodiments of the invention enables an operator of a wireless network to serve very large numbers of users in a hotspot area via a RRH system with many RRH units and antenna elements per site. Embodiments of the invention allow users using the same pilot resources to be served simultaneously by a RRH unit. This allows network densification benefits to be realized together with large antenna arrays benefits, thereby enabling very large spectral efficiencies (and throughputs) per unit area. These deployments would allow the network operator to substantially increase the provided throughput per unit area and can provide substantial improvements in user experience over hot spot areas.

Embodiments of this invention include protocols for uplink pilot reuse across a RRH-based system or a small-cell network, in conjunction with methods and apparatuses for fast active-user proximity detection at the associated RRH units or small-cell base stations. Embodiments of the invention can enable large densification benefits to be realized in the DL of wireless networks. In one embodiment, the disclosed UL pilot protocols also combine fast active-user proximity reciprocity with acquisition of the user-channels and reciprocity-based DL MIMO transmission. More specifically, full channel reciprocity applies within each resource block (RB) (e.g., set of resource elements in time and frequency) within the coherence time and coherence bandwidth of the channel, according to which the channel stays constant. If transmitting an UL pilot, measuring the channel, and then transmitting in the DL (and the UL and DL channels are still the same), the full reciprocity can be exploited. However, if one considers the channels over two different resource blocks that are at the same time but at different frequency bands, then the UL channel on RB 1 is the same as the DL channel on RB 1, and the UL channel on RB 2 is the same as the DL channel on RB 2. However, the UL channels on RBs 1 and 2 are different. At the same time, however, the average channel power of the UL channels on RBs 1 and 2 is the same. By transmitting an UL pilot on RB1, the UL (and DL) channel power on RB 1 and RB2 can be learned. Thus, this proximity reciprocity applies throughout the whole band (i.e., it is not limited within the coherence bandwidth of the channel).

Although not described in detail, the same UL pilot reuse protocols and the corresponding "on-the-fly" user proximity detection mechanisms can be used also for UL data transmission. In one uplink data transmission embodiment, the RRH (or small cell BS) decodes the packet of the detected active-user that is in proximity to it (when a single one is detected in proximity).

Techniques disclosed herein are henceforth described in detail for RRH systems. Similar methods can be straightforwardly applied to networks of small-cells. Without loss of generality, in one embodiment, the following scenario involves a BS controller, controlling J RRH units, that is serving a user population based on OFDM transmission. OFDM transmission resources are split into "slots", or, resource blocks (RBs), with each slot/RB corresponding to a contiguous block of OFDM subcarriers and symbols. In one embodiment, within each RB or slot, a subset of users across the network are active, i.e., are scheduled for transmission.

Without loss of generality, in one embodiment, a scheduler operation, according to which the set of active user terminals (i.e., the set of user terminals scheduled for data transmission) is the same across several (potentially all) concurrent slots. In one embodiment, although not necessary, to make the treatment concrete, a block-fading channel model is used where the channel coefficients remain constant within each RB/slot. In one embodiment, within each set of N concurrent slots, the RRH system schedules a subset of K active single antenna users for data transmission. For purposes herein, the active users and RRH units are indexed by the indices k and j, respectively, with k from the active user set $\mathcal{K}=\{1, 2, \ldots, K\}$ and j in the RRH set. $\mathcal{J}=\{1, 2, \ldots, J\}$. In one embodiment, the RRH unit j has $M_j$ antennas and $M_j \gg 1$.

In one embodiment, the wireless network uses TDD operation with reciprocity-based channel state information (CSI) acquisition, according to which each RRH learns the DL channel on a given slot between its antenna array and an active user terminal based on an UL pilot transmitted by the user terminal within the given slot. In one embodiment, for convenience that within each slot, Q pilot dimensions are allocated for UL pilots. In one embodiment, the Q pilot dimensions correspond to the Q time-frequency resource elements of the slot. In another embodiment, each of the Q pilot dimensions is a code Q pilot resource-elements, with the Q pilot codes being orthogonal to one another. In one embodiment, these resource elements are elements of OFDM symbols preceding the OFDM resource elements used for DL data transmission. The time-frequency elements on one or more OFDM symbols immediately following the OFDM symbols allocated to UL pilots may be dedicated to BS processing (and may also allow the system to transmission from UL (pilot) transmissions to DL data transmission). They provide the computation time necessary for the BS controller of the RRH system to process the received pilot transmissions and construct the precoded DL data signal that is to be transmitted over the remaining resource-elements of the slot that follow.

For comparison, if used as a baseline, the conventional setting, according to which the RRH system schedules a single active user on each of the Q pilot dimensions for UL pilots, i.e., K=Q. Each RRH unit has a coded packet ready for transmission for each user (the coded packet for user k is the same at all RRH units). Every RRH antenna in the vicinity of active user k can estimate its DL channel coefficient to user k from the uplink pilot transmitted by user k. This enables the training of large antenna arrays (e.g., $M_r \gg 1$) with training overhead proportional to the number of simultaneously served users. In contrast to feedback-based CSI acquisition, it also allows a user terminal to train multiple nearby BSs without incurring additional training overheads.

In one embodiment, each RRH unit j in the vicinity of user k estimates the channel between its antenna array and the k-th active user based on the received pilot on the k-th pilot dimension. In one embodiment, each RRH unit uses the Q user-channel estimates to design a MU-MIMO precoder (e.g., CBF, or ZFBF) to serve the Q (or fewer) active users. An RRH unit may choose, for instance, not to serve users that are sufficiently far from the RRH unit (i.e., users whose channels are received at a weak receive signal power at the RRH unit). Note that the multiplexing gain of this scheme (i.e., the number of user terminals that can be served simultaneously) is at most Q.

Embodiments of this invention comprise mechanisms that achieve densification benefits with aggressive pilot reuse. For convenience, the UL pilot dimensions in each slot are enumerated from 1 to Q. In one embodiment, a common set of active users are scheduled over a set of N concurrent slots on the same pilot dimension. In one embodiment, the set of q-th pilot dimensions on all N concurrent slots are assigned to the same set of L users for pilot transmission. FIG. 1 shows one such example involving the first pilot dimension in N=5 concurrent ports, where the user-proximity detection pilot codes are transmitted over N=5 concurrent slots (using one port/pilot dimension per slot), allowing L=N=5 users (UTs) to be multiplexed on the same pilot dimension. Referring to FIG. 1, a "1" implies that the user broadcasts a pilot over the corresponding slot, while a "0" implies that the user remains silent on a given slot. Unlike the conventional system that would assign a single user on each of these N=5 pilot dimensions, multiple users (L=5 in the example) are assigned to transmit pilots over these pilot dimensions. The pilot pattern (code) however differs from one user to the next. In this example, each user sends a pilot on N−1 out of the N q-th pilot dimensions (one q-th dimension per slot) and remains silent in the other dimension. In particular, the n-th user for n=1, 2, . . . , L=N sends a pilot on all slots except slot n. In principle, the maximum multiplexing gain that can be supported across all Q pilot dimension by such an operation is (N−1)Q (as opposed to Q for the baseline scheme).

Figure 3:
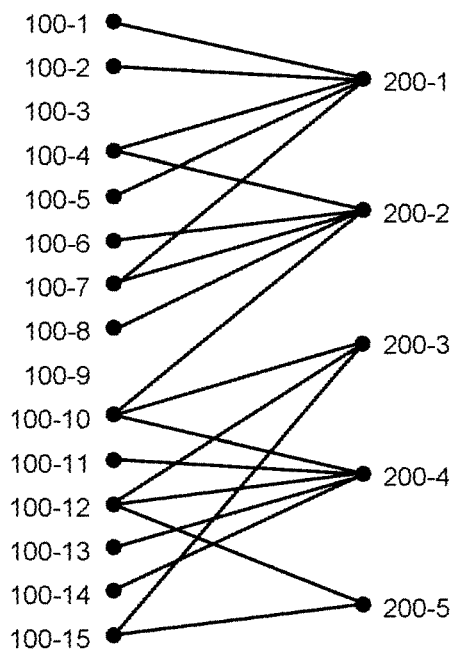
FIG. 3 illustrates a connectivity graph for the example in FIG. 2.

FIG. 2 illustrates an RRH system serving users on the 1st dimension of a set of N=5 concurrent pilots using the code of FIG. 1. This also illustrates the densification benefits provided by this code. Referring to FIG. 2, base-station 300-1 operates a set of RRHs 200-1, 200-2, . . . , 200-15. User terminals 200-n (for 1≤n≤5) operate on pilot dimension 1 across N=5 concurrent slots and are each assigned a unique codeword (e.g., out of the ones in FIG. 1). FIG. 3 shows a connectivity graph associated with the scenario in FIG. 2. Referring to FIG. 3, there is an edge between an RRH unit 100-j and a user terminal 200-n in the connectivity graph in FIG. 3 if and only if user terminal 200-n is in the proximity of RRH unit 100-j (i.e., the large-scale gain in the channel between user terminal 200-n and RRH unit 100-j is sufficiently large).

Referring back to FIG. 2, consider reception of the pilot transmissions of user terminals 200-n over the N concurrent slots at RRH 100-1. From FIG. 2, RRH 100-1 is in the proximity of user terminal 200-1 but not in the proximity of user terminals 200-2, 200-3, 200-4, and 200-5. As a result, RRH 100-1 receives non-negligible signal energy on the $1^{st}$ pilot dimension of all 5 slots except slot 1. Since RRH 100-1 knows that all the users but user 100-1 transmitted pilots on the $1^{st}$ pilot dimension of slot 1, it knows that users 200-2, 200-3, 200-4, and 200-5 are not in its proximity. Hence only user 200-1 can be in its proximity. Given also that RRH 100-1 receives non-negligible power on the 1st dimension of the remaining four slots, it knows user terminal 200-1 is indeed in its proximity. Because of this, the channel estimate obtained from the pilot reception on the $1^{st}$ dimension of all slots except slot 1 is associated with user terminal 100-1. RRH 100-1 uses that in its precoder design to transmit the 4 packets for user 200-1 (it does not of course sent packets for user terminals 200-2, 200-3, 200-4, and 200-5) in the 4 slots user terminal 200-1 has transmitted a pilot. A similar operation is followed with 100-2 and 100-5. They both identify user 200-1 as the only user in their proximity and transmit the same (slot-dependent) packet to user 200-1, on a precoder based on their channel estimate from the $1^{st}$ pilot dimension observation on each of the four slots user terminal 200-1 has transmitted a pilot. Similarly, RRH 100-6 and 100-9 (RRH 100-11 100-13 and 100-14) detect user terminal 200-2 (user terminal 200-4) as the only one in their vicinity transmitting UL pilots on the $1^{st}$ pilot dimension and thus transmit the associated slot-dependent packets to user 200-2 (user 200-4). In every case, the UE in proximity is identified uniquely by the slot for with the RRH has a low energy return on the $1^{st}$ pilot dimension. It is also worth considering the case in which an RRH is in proximity of 2 or more users such as, for example, RRH 100-4. Note that, because both terminal 200-1 and terminal 200-2 are in its vicinity, RRH 100-4 observes significant energy return on the first pilot dimension across all N concurrent slots, which indicates to the RRH that at least two user terminals are in its proximity (and therefore the channel estimated at the RRH is the sum of the channels of these UEs). This is a "pilot-collision" event. All such RRHs that detect such a "pilot-collision" event (i.e., RRH 100-4, 100-7, 100-10, 100-12, 100-15) remain silent on the 1st pilot dimension, i.e., they do not serve any of the user terminals 200-1, 200-2, . . . , 200-5.

Figure 4:
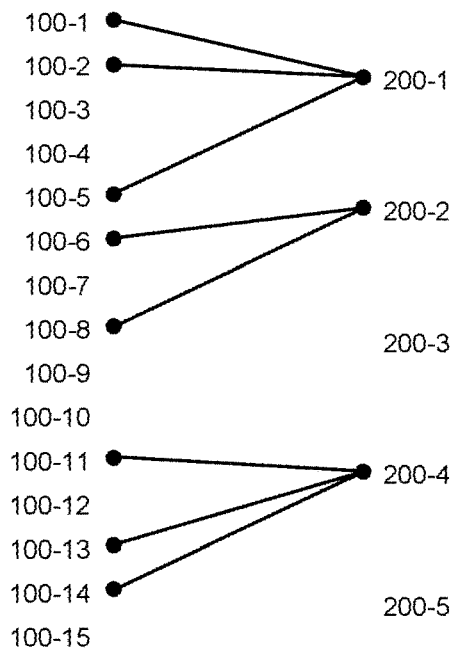
FIG. 4 illustrates a user-packet serving graph for the example in FIG. 2.

FIG. 4 shows a serving graph associated with the scenario of FIG. 2. Referring to FIG. 4, there is an edge between an RRH unit 100-j and a user terminal 200-n in the serving graph if and only if user terminal 200-n (is in the proximity of and) is served by RRH unit 100-j (i.e., the large-scale gain in the channel between user terminal 200-n and RRH unit 100-j is sufficiently large, and no other user terminal that is active on the same set of ports has a large-scale gain in its channel to RRH unit 100-j that is sufficiently large). From the graph, it is clear that over the given set of concurrent slots, the RRH unit is able to simultaneously serve 3 user terminals (200-1, 200-2, 200-4) from the first group out of the Q pilot dimensions (ports) as opposed to just 1 in the baseline RRH unit.

In general, in one embodiment, if L users are scheduled for transmission on the same pilot dimension of a set of N concurrent slots with an appropriately designed code, then the code allows the RRH to do the following:

detect collisions, i.e., identify all events where any two or more out of the L user terminals are in the proximity of the RRH unit;

identify the single-user in proximity, i.e., in any event where only one user-terminal is in the proximity of the RRH unit, the RRH unit can identify that indeed only one user terminal is its proximity, and can furthermore determine which terminal (out of the L active user terminals on the pilot dimension) it is.

Thus, the RRH unit determines which user channels it can resolve among a group of users transmitting pilots in identical pilot resources by determining the user is in proximity of the system and no other user in the group of users transmitting pilots that has transmitted a pilot on the identical pilot resources is in proximity of the system and can identify user identity when only a single user is determined to be in proximity of the system.

With such an operation, an RRH system can thus serve on each pilot dimension anywhere from 0 to L users simultaneously. In such a system, there is a trade-off between the RRH system coverage area and the aggressiveness of assigning multiple users on the same pilot dimension. Consider for example of a fixed RRH system serving a fixed coverage area, and consider increasing L (corresponding to assigning pilot dimensions more aggressively) from L=1 onward. Assume also that the active users on the $1^{st}$ pilot dimension are randomly chosen across the geographical area by the BS controller of the RRH system. As L is initially increased from 1 to, for example, 2, immediate multiplexing is realized assuming a sufficiently large geographical coverage area. This is because, as long as for each user terminal there is one RRH which sees only that user terminal, 2 users can be served. Increasing L keeps on yielding multiplexing gain benefits until a point is reached where there are so many users assigned on the same pilot dimension that the probability of collision outweighs the benefits of increasing the value of L. In general, the value of L can be chosen to maximize the expected multiplexing gains, i.e., the product of L times the probability that an active user is served by at least one RRH unit (this probability decreases with L, the number of active users on the $1^{st}$ pilot dimension).

Over a generic RB/slot, letting $G_j$ denote the $M_j \times K$ channel matrix between the RRH j antennas and the K users, with the associated k-th user channel given by the k-th column, $$g_{kj} = [g_{kj,1}, g_{kj,2}, \ldots, g_{kj,M_j}]^T.$$

The channel between RRH j and user k can be expressed as $g_{kj} = \sqrt{\beta_{kj}} h_{kj}$ with the slow-fading scalar $\beta_{kj}$ characterizing the combined effect of distance based pathloss and the location-based shadowing, and the vector $h_{kj} = [h_{kj,1}, h_{kj,2}, \ldots, h_{kj,M_j}]^T$ capturing small-scale fading. Without loss of generality, each link experiences independent Rayleigh fading, i.e., the $h_{kj,i}$'s are i.i.d. $C\mathcal{N}(0,1)$ random variables, where $C\mathcal{N}(0,1)$ denotes a complex-valued circularly symmetric Gaussian random variable with zero mean and unit variance.

Assume users are scheduled for transmission on sets of N concurrent blocks and L=N users are assigned a common (e.g., $1^{st}$) pilot dimension as, e.g., described in FIG. 1. In particular, consider that for any given k=1, 2, ..., N, the user terminal with index k transmits a fixed energy pilot on the $1^{st}$ pilot dimension of all N concurrent slots except slot k. Let $y_j[n] = [y_{j,1}[n] \ y_{j,2}[n] \ldots y_{j,M_j}[n]]^T$ denote the received signal on the first pilot dimension of slot n by the antenna array at RRH unit j. Let $\varepsilon[n] = \Sigma_{l=1}^{M_j} |y_{j,l}[n]|^2$ denote the average (over the antennas) received signal energy on the first pilot dimension of slot n by the antenna array at RRH unit j.

For large $M_j$, $\varepsilon[n]$ approximately satisfies $\varepsilon[n] \approx \Sigma_{k \neq n} \beta_{kj} + \sigma^2/M_j$. As a result, if none of the users besides user k is in proximity, $\varepsilon[n]$ would be small, while if at least one user is in the proximity of the RRH unit j (i.e., $\beta_{kj}$ is significant for at least on user with index k different from n) $\varepsilon[n]$ would be large. Consequently, a simple received energy calculation (averaged over the antennas at RRH unit j) on the $1^{st}$ pilot dimension of each of the N slots followed by a threshold comparison to determine high (H) vs. low (L) received energy levels suffices for implementing the code in FIG. 1 and for using it for fast user-proximity detection and serving by the RRH unit j.

The pilot code in FIG. 1 allows "multiplexing" over N concurrent slots up to L=N users. The code allows detecting when a single user is in proximity of an RRH unit, and in addition, identifying the user when a single user is in proximity Since the detected user is only transmitting a pilot on only N−1 out of the N slots, an RRH unit (and thus the RRH system) can only serve the user in N−1 out of N slots. This corresponds to a loss in efficiency, as the multiplexing efficiency of serving that user is reduced from 1 user to (N−1)/N. Consequently, the code in FIG. 1 allows multiplexing up to L=N users on a single pilot dimension and has efficiency (N−1)/N.

Figures 5, 6:
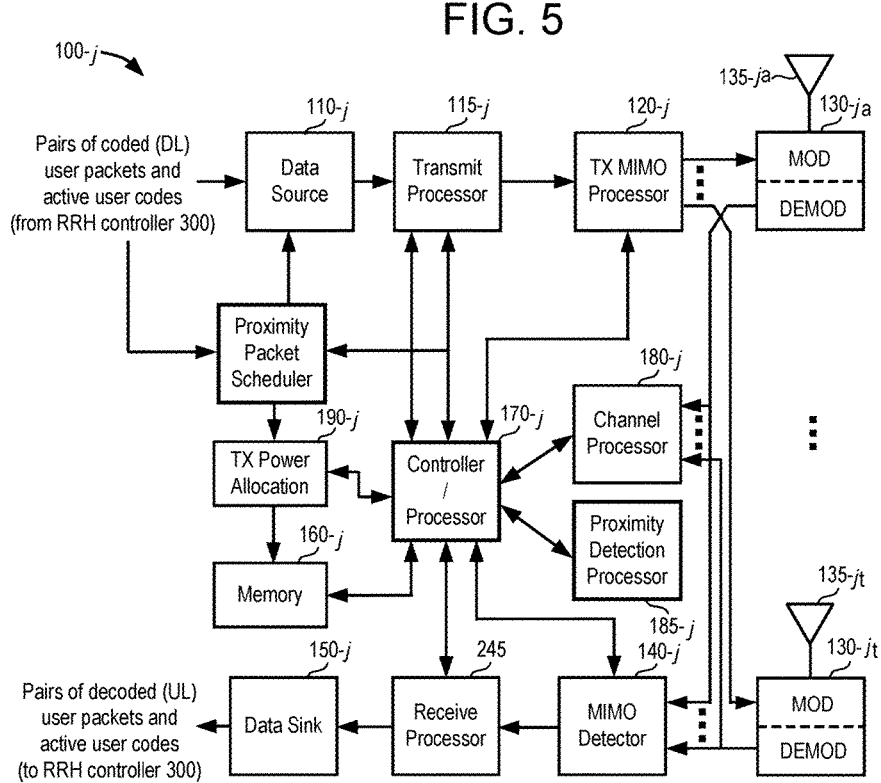
FIG. 5 illustrates an example of a user-proximity detection code over a number of concurrent slots.
FIG. 6 is a block diagram of one embodiment of a RRH site system.

Other codes can be designed that can "multiplex" L>N users over N concurrent slots, while still allowing the RRH to determine whether or not a single user is in proximity along with identifying the single user in proximity. One class of such codes is demonstrated in FIG. 5. Referring to FIG. 5, a user-proximity detection code over N=5 concurrent slots (using one port/pilot dimension per slot) that allows multiplexing L=6>N users over a common pilot dimension (i.e., the same pilot dimension). A "1" implies that the user broadcasts a pilot over the corresponding slot, while a "0" implies that the user remains silent on the given slot. The code has efficiency (N−2)/N=⅗. Letting N=$N_1$+$N_2$, this kind of construction allows multiplexing up to L=$N_1 \times N_2$ users. In one embodiment, a user-terminal is given a two-digit ID with the m-th digit taking one of $N_m$ values and the N slots are divided into $N_1$ first-digit slots and $N_2$ second-digit slots. A user terminal with ID "$n_1 \ n_2$" sends a pilot over all slots except 1st digit slot $n_1$ and $2^{nd}$ digit slot $n_2$. It is easy to verify that if a RRH unit detects low power on the first pilot dimension of only first-digit slot $n_1$ and $2^{nd}$ digit slot $n_2$, then the user terminal with ID "$n_1 \ n_2$" is identified as the single user terminal in proximity of the RRH unit.

These codes can be readily generalized. Given a number of concurrent slots N satisfying N=$\Sigma_{i=1}^{m} N_i$ for some set of positive integers $N_i$, up to L=$\Pi_{i=1}^{m} N_i$ user terminals can be multiplexed (and detected when in proximity in isolation) on the same pilot dimension. The efficiency of such a code is (N−m)/N.

Other code constructions can be used that can improve upon the maximum number of codes, L, that can be multiplexed subject to a given N and a given efficiency (N−m)/N. In one embodiment, each user given an N-bit binary ID, whereby each user ID comprises m zeros and N−m ones. A user sends a pilot on the n-th slot if and only if its n-th bit in its ID equals 1. It can be readily verified that in the case a single user terminal is present, the RRH will detect a low-energy received pilot signal on exactly the m slots for which the corresponding user terminal did not send pilots.

Furthermore, collisions are easily identified: the RRH detects a low-energy received pilot signal in less than m slots. In one embodiment, for a given N and m, this class of codes allows multiplexing up to $$L = \binom{N}{m}$$

user terminals. When N is even, the maximum number of user terminals that can be multiplexed on the same pilot dimension is given by $$L = \binom{N}{N/2}$$

and has efficiency ½. When N is odd, the maximum number of user terminals that can be multiplexed on the same pilot dimension is given by $$L = \binom{N}{(N-1)/2}$$

and has efficiency $(N^{-1}+1)/2$. To contrast this code against the one in FIG. 5, with N=5, this code allows multiplexing up to L=10, with the same efficiency of ⅗.

Figures 7, 8:
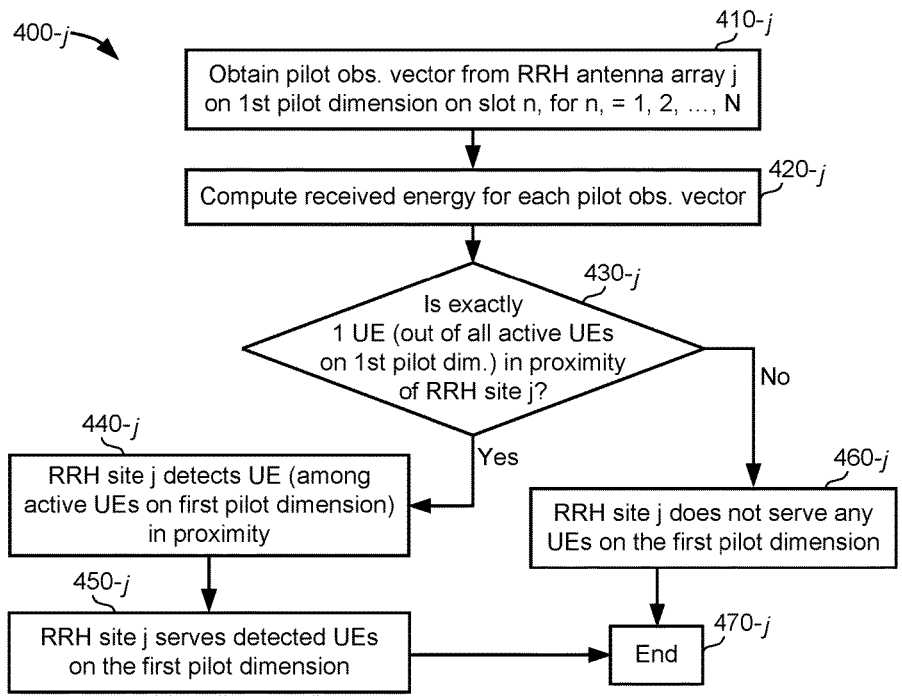
FIG. 7 is a flow diagram of one embodiment of a process for performing active-user proximity detection at a RRH site.
FIG. 8 illustrates a table showing the maximum number of users that can be supported over the same pilot dimension as a function of the number of concurrent slots over which the same set of users is scheduled and the number of slots over which a user broadcasts no pilot.

FIG. 8 illustrates a table showing the maximum number of users that can be supported over the same pilot dimension as a function of N (number of concurrent slots over which the same set of users is scheduled) and m (number of slots over which a user broadcasts no pilot). The table in FIG. 8 considers the maximum L supported over N concurrent slots for N=6 and N=12, as a function of m, which is the number of slots over which each active user terminal is silent. As is evident from the table, for the same efficiency, scheduling over N=12 concurrent slots allows supporting orders of magnitude more active users per dimension on the same pilot set of dimensions than its N=6 counterpart.

Note that in one embodiment there is an optimal L, i.e., there is an optimal value for the number of active users to schedule on a common set of pilot dimensions by an RRH system. For instance, as L is increased starting from L=1 to L=2 the probability that two (at random) scheduled active users on the same pilot dimensions collide is very small. As a result, multiplexing gains (serving two active users at a time) are immediately realized. This increase in multiplexing gains continues with increasing L values for sufficiently small L values so that collision probability is small. At the other extreme of large L values, where the collision probability is large, the multiplexing gains diminish and become zero in the very large L limit. Clearly, there is an optimal L (or optimal range of L values) where the expected multiplexing gains (product of L times the probability that a user can be served by at least one RRH unit) are maximized. In general, the optimal L value depends on the density of the RRH units and the coverage area of the RRH system. Also, given an N value, if there is a code that can provide an L value in the optimal required range, the code (or any code) providing the maximum efficiency can be used. If, however, for the given N value, there is no code that can provide an L value sufficiently large to be in the optimal range, then the code yielding the maximum multiplexing gain is selected taking into account in each case the loss in efficiency incurred by the use of the given code.

FIG. 6 shows a block diagram of one embodiment of a module 100-j at RRH unit j. Referring to FIG. 6, RRH module 100-j includes standard modules for MIMO wireless transmission. A transmit processor 115-j at RRH 100-j receives data for one or more active UTs from a data source 110-j, and information indicative of the subset of these UTs to schedule for transmission from a scheduler module 125-j. Transmit processor 115-j processes the data for each scheduled UT that is scheduled by scheduler module 125-j and generates data symbols to all UTs scheduled for transmission by the RRH module 100-j. In one embodiment, processor 115-j also receives and processes control information from a controller/processor 170-j and provide control symbols.

In one embodiment, controller/processor 170-j also generates reference symbols for one or more reference signals. In one embodiment, a transmit (TX) MIMO processor 120-j performs precoding on the data symbols, the control symbols, and/or the reference symbols for each UT. In one embodiment, TX MIMO processor 120-j also receives information from channel processor 180-j (via controller/processor 170-j) indicative of the channel between one or more of these active UTs and RRH antennas, as well as transmit power allocation information from TX power allocation unit 190-j (again via controller/processor 170-j).

In one embodiment, processor 120-j provides parallel output symbols streams to modulators, MODS (130-ja through 130-jt). Each modulator 130-j further processes (e.g., convert to analog, amplify, filter, and up-convert) the output sample stream to obtain a downlink signal. The downlink data signals from modulators 130-ja through 130-jt may be transmitted via antennas 135-ja through 135-jt, respectively.

In one embodiment, RRH 100-j, the uplink pilot signals from all active UT's within a set of concurrent slots are received by antennas 135-ja through 135-jt, and demodulated by demodulators (DEMODs 130-ja through 130-jt). The demodulated pilot signals may be used by proximity detection processor 185-j to determine on which pilot dimensions across a set of concurrent slots there is a single active UT in proximity transmitting uplink pilots. In one embodiment, as described herein, proximity detection processor 185-j determines which UT channels the UT-proximity detection processor 185-j can resolve among a group of UTs transmitting pilots in identical pilot resources. In one embodiment, UT-proximity detection processor 185-j resolves a UT channel of a UT by determining the UT is in proximity of the system and no other UT in the group of UTs transmitting pilots that has transmitted a pilot on the identical pilot resources is in proximity of the system.

In one embodiment, proximity detection processor 185-j exchanges control information with the controller/processor 170-j. The detected active UTs pilot-dimension pair combinations are then passed via controller/processor 170-j to proximity packet scheduler 125-j, which may schedule one or more active UTs for DL transmission and possibly UL data detection over one or more of the set of concurrent slots.

For the purposes of DL data transmission, the detected active UT pilot-dimension pair combinations may also be passed via controller/processor 170-j to TX power allocation module 190-j, which in one embodiment allocates power to the DL signals to one or more active UTs for DL transmission. In one embodiment, the demodulated pilot signals output by DEMODs 130-ja through 130-jt are also provided to channel processor 180-j where the uplink channel is estimated and provided to controller/processor 170-*j*. In determining the power allocation to the DL data signals of the scheduled active UTs, in one embodiment, TX power allocation module 190-*j* also uses, as input, the output of channel processor 180-*j*. In the case of UL data transmission within the set of concurrent slots, the uplink signals transmitted from all active UT's are received by antennas 135-*ja* through 135-*jt*, and demodulated by demodulators (DEMODs 130-*ja* through 130-*jt*). In one embodiment, using the UL data detection schedule provided by proximity packet scheduler 125-*j*, the demodulated signals are detected by MIMO detector 140-*j* and further processed by a receive processor 145-*j* to obtain decoded data and control information sent by be subset of active UTs scheduled for data detection.

In one embodiment, receive processor 145-*j* may receive detected signals from MIMO detector and provides decoded data to a data sink 150-*j* and control information to the controller/processor 170-*j*.

FIG. 7 shows a flow diagram for one embodiment of the active-user proximity detection process performed at RRH unit j (proximity detection processor 185-*j* of RRH module 100-*j*) on the first pilot dimension of N concurrent slots. The process is performed by processing logic that may comprise hardware (circuitry, dedicated logic, etc.), software (such as is run on a general purpose computer system or a dedicated machine), firmware, or a combination of all three. In one embodiment, the process is performed by the proximity detection processor of a wireless device.

Referring to FIG. 7, initially, module 100-*j* obtains observations across its antenna array on the first pilot dimension of each slot n, for n=1, 2, ..., N (processing block 410-*j*). Subsequently, module 185-*j* computes the received pilot signal energy across the antenna array of RRH unit j on the first pilot dimension on each slot n, for each n=1, 2, ..., N (step 420-*j*). Subsequently, module 185-*j* determines whether the number of UEs that are in the proximity of RRH j (out of all active UEs on the first pilot dimension) is equal to 1 or not (processing block 430-*j*). If that number is 1, the UT in proximity is detected (processing block 440-*j*) and the RRH serves that UTs packet using the channel estimate obtained in the 1st pilot dimension (processing block 450-*j*). If, however, no UEs are detected in proximity, or more than one UT are detected in proximity (pilot collision), RRH module 185-*j* serves no UTs based on its user-channel estimate on the first pilot dimension (processing block 460-*j*).

Figures 9A, 9B:
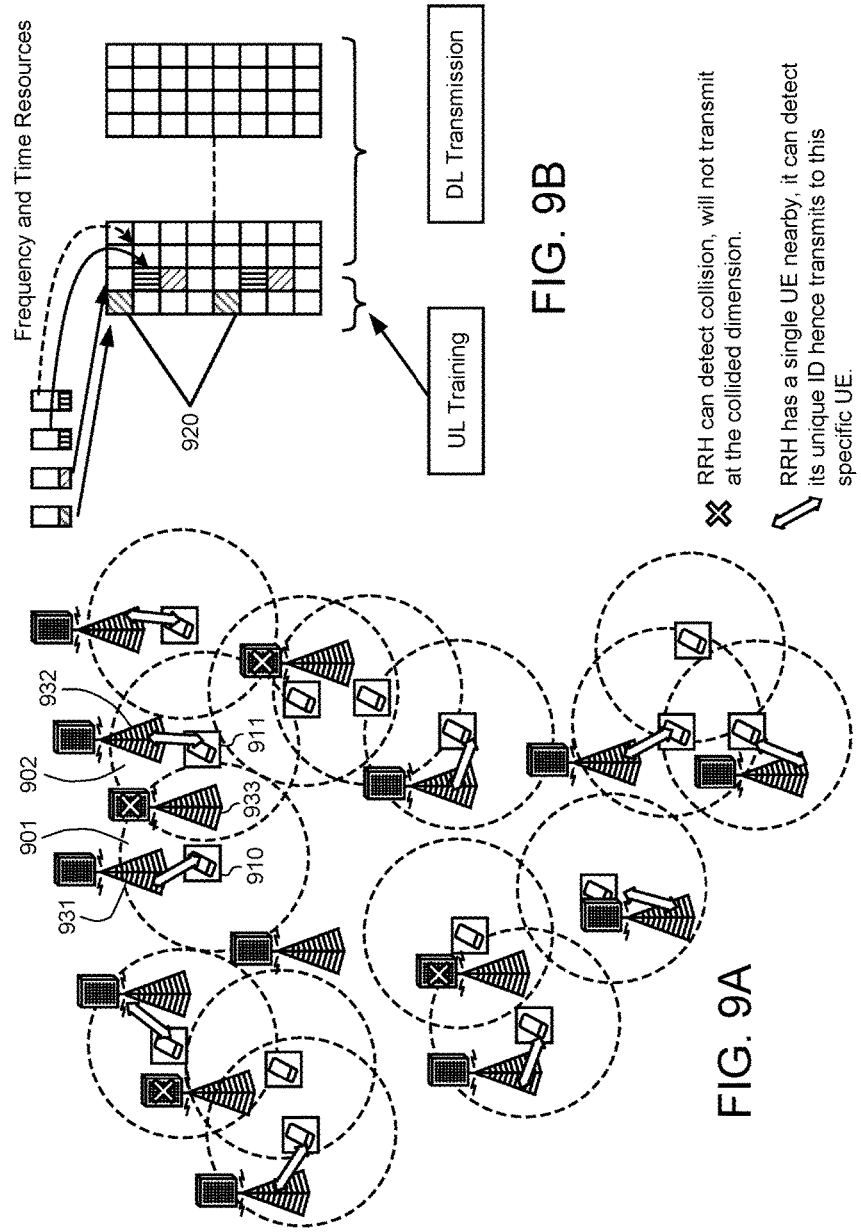
FIG. 9A illustrates a wireless network having multiple RRHs that communicate wirelessly with UTs.
FIG. 9B illustrate allocation of resource blocks for uplink training and downlink transmission.

Another example of the use of the techniques described herein is shown with reference to FIGS. 9A and 9B. FIG. 9A illustrates a wireless network having multiple RRHs, or other wireless systems, that communicate wirelessly with UTs. While the wireless systems are shown as remote radio heads (RRHs), in another embodiment, the wireless systems may be base stations.

UTs are assigned uplink pilot resources for training. In one embodiment, the same uplink pilot resources may be assigned to more than one user. For example, UTs 910 and 911 may be assigned the same pilot resources. For example, as shown in FIG. 9B, UTs 910 and 911 may be assigned frequency and time resource blocks 920.

In one embodiment, where both UTs 910 and 911 are active and transmitting uplink pilots using the frequency and time resource blocks, RRHs 931 and 932 are able to detect a single UT nearby, namely UTs 910 and 911, respectively. As there are no collisions occurring between pilot transmissions from multiple UTs, RRHs 931 and 932 are able to detect the unique identifier (ID) associated with UTs 910 and 911 respectively. Using this information, wireless systems 931 and 932 are able to serve (e.g., send data to) UTs 910 and 911.

On the other hand, RRH 933 is able to detect a collision between the uplink pilots transmitted by UTs 910 and 911. In such a case, wireless system 933 would not serve either of UTs 910 and 911.

Figure 10:
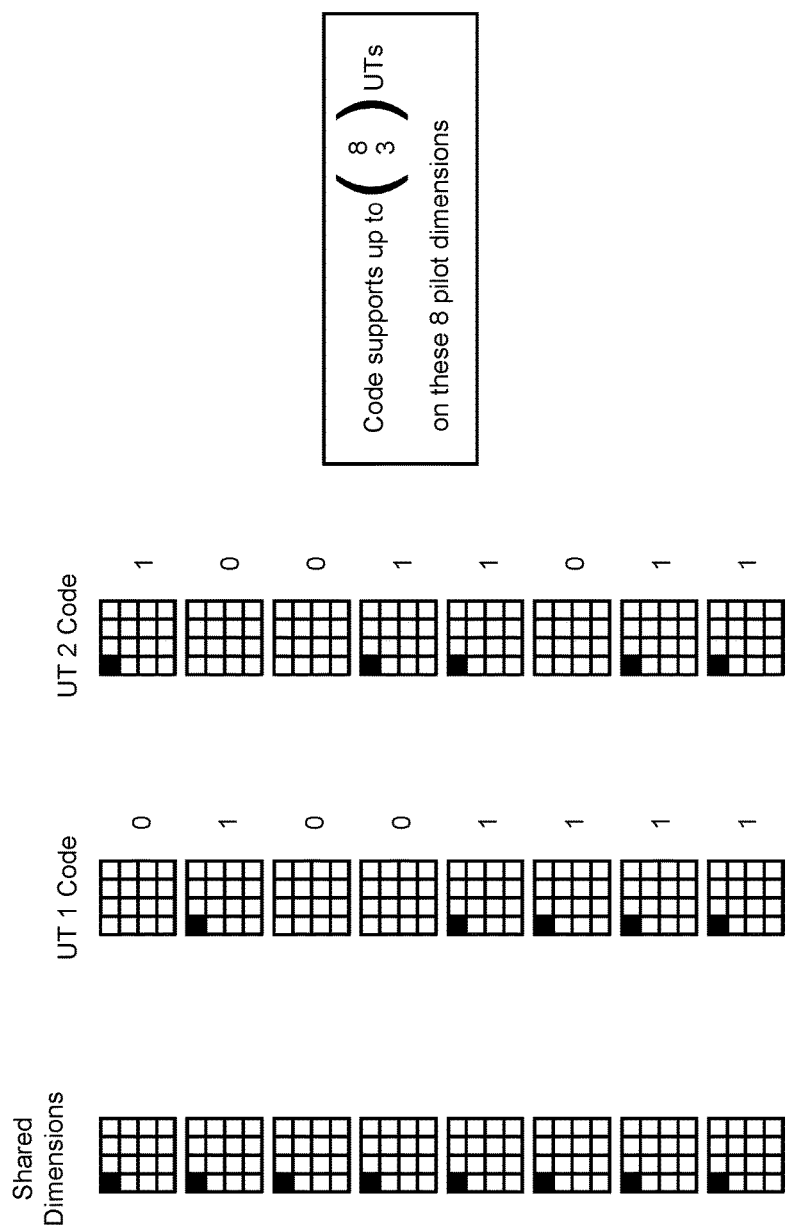
FIG. 10 illustrates one embodiment of the shared pilot dimensions used by a pair of user terminals.

FIG. 10 illustrates one embodiment of the shared pilot dimensions used by a pair of user terminals. Referring to FIG. 10, the resource block in the upper left corner of the resource elements is used by UT 1 and UT 2. UT 1 and UT 2 have a unique preassigned code (ID) to identify themselves. For example, the preassigned code identifying UT 1 is 01001111, while the preassigned code identifying UT 2 is 10011011. Thus, both UTs are identified by an 8 digit code. Using a preassigned code of 8 digits, the code can support up to $$\binom{8}{3}$$

UTs on these 8 pilot dimensions.

Both UT 1 and UT 2 broadcasts these preassigned codes as part of the pilot uplink pilot transmissions during the upper left corner resource blocks. If an RRH detects either of the preassigned codes for UT 1 or UT 2 but not both, then that RRH can determine that the UT is in its proximity, the RRH can identify it through its ID, and the RRH then can subsequently serve data to that UT. However, if an RRH receives energy levels that indicate that both UTs 1 and UT 2 are in proximity of the RRH, then the RRH determines that a collision has occurred and will not serve data to either of the UTs.

Thus, the RRH can detect a pilot collision (instantly without any message exchanges), detect that a single UT is in its proximity, detect the ID of that single UT in its proximity if only an active user is present, and determine that no active users in its vicinity for this pilot dimension.

Figure 11:
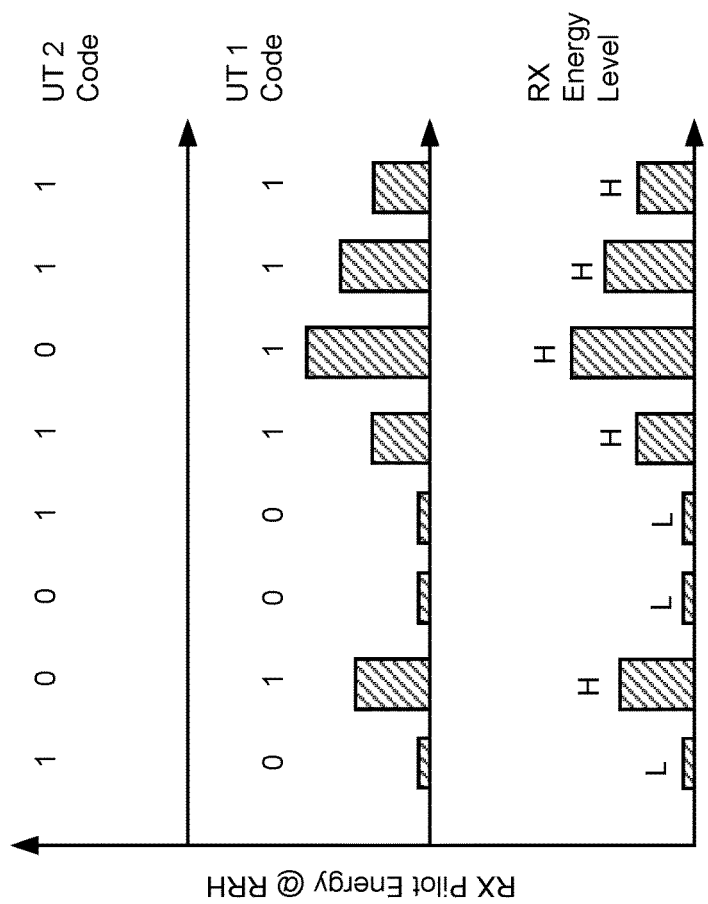
FIGS. 11 and 12 illustrate examples of when only one user terminal is near a RRH and when two user terminals are near an RRH.
Figure 11:
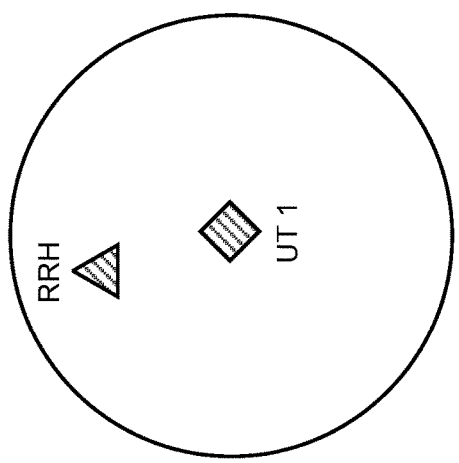
Figure 12:
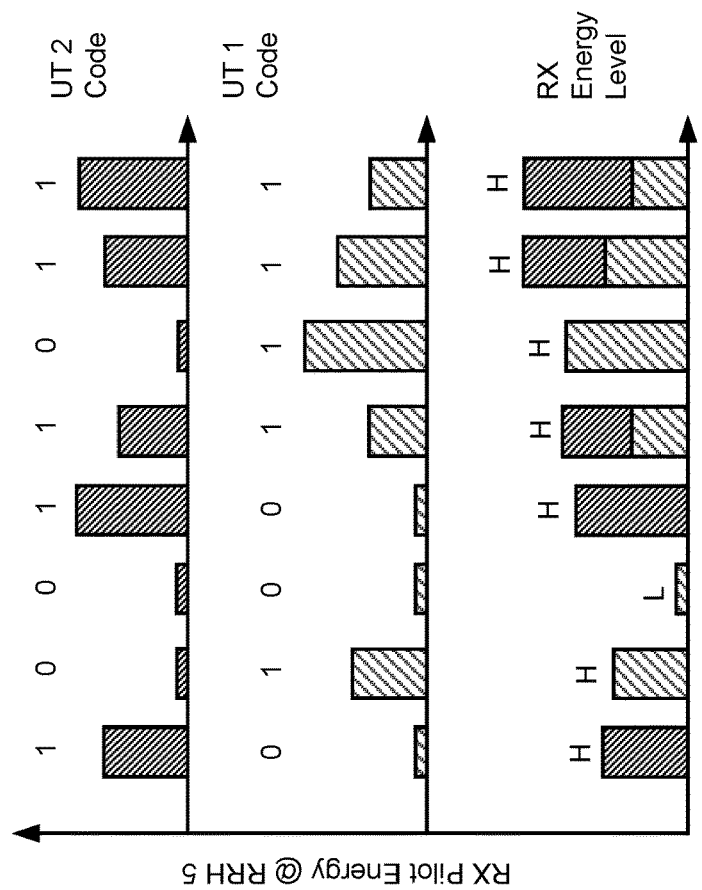
Figure 12:
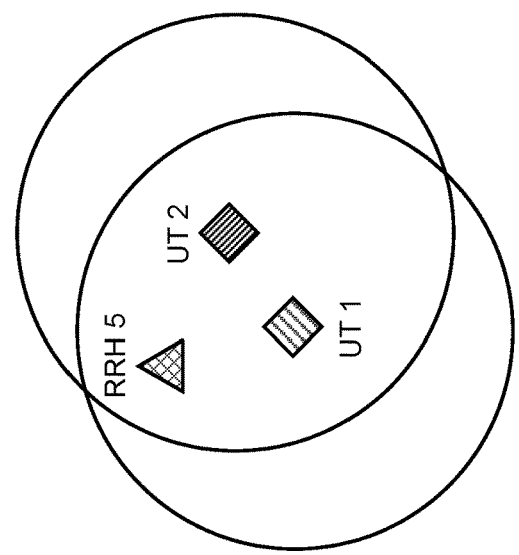

FIGS. 11 and 12 illustrate the two situations involving the example of having one or two UTs near the RRH describe above. Referring to FIG. 11, in the case that only UT 1 is the only UT in proximity of the RRH, the code of UT 1 is the only code that is contributing to the pilot energy received by the RRH. In this case, the RRH sees three L received energy levels and five H energy levels. From the location of the Ls, the RRH can identify UT 1 is the only UT in proximity. That is, in this case, the three L received energy levels uniquely identify UT 1. In this case, the RRH can serve (e.g., send data to) UT 1.

Referring to FIG. 12, in this case both UT 1 and UT 2 are in proximity of the RRH and are both transmitting uplink pilots. In this case, the received pilot energy represents a combined energy level corresponding to the ones and zeroes in the codes of UT 1 and UT 2. Because the RRH receives the pilot energies that represent the combined energies associated with the codes of UT 1 and UT 2, the RRH sees only one L received energy level. Since there are fewer than three Ls, the RRH detects a collision and determines that both UT 1 and UT 2 are in its proximity. Based on this, the RRH does not serve either of the UTs on these eight pilot dimensions.

Note that the example includes two UTs that share common pilot dimensions (e.g., common pilot resources). However, the techniques described herein are not limited to detecting the proximity of only two UTs causing a collision and are applicable to an RRH (or other wireless system) detecting the uplink pilot transmissions of more than two UTs.

Figure 13:
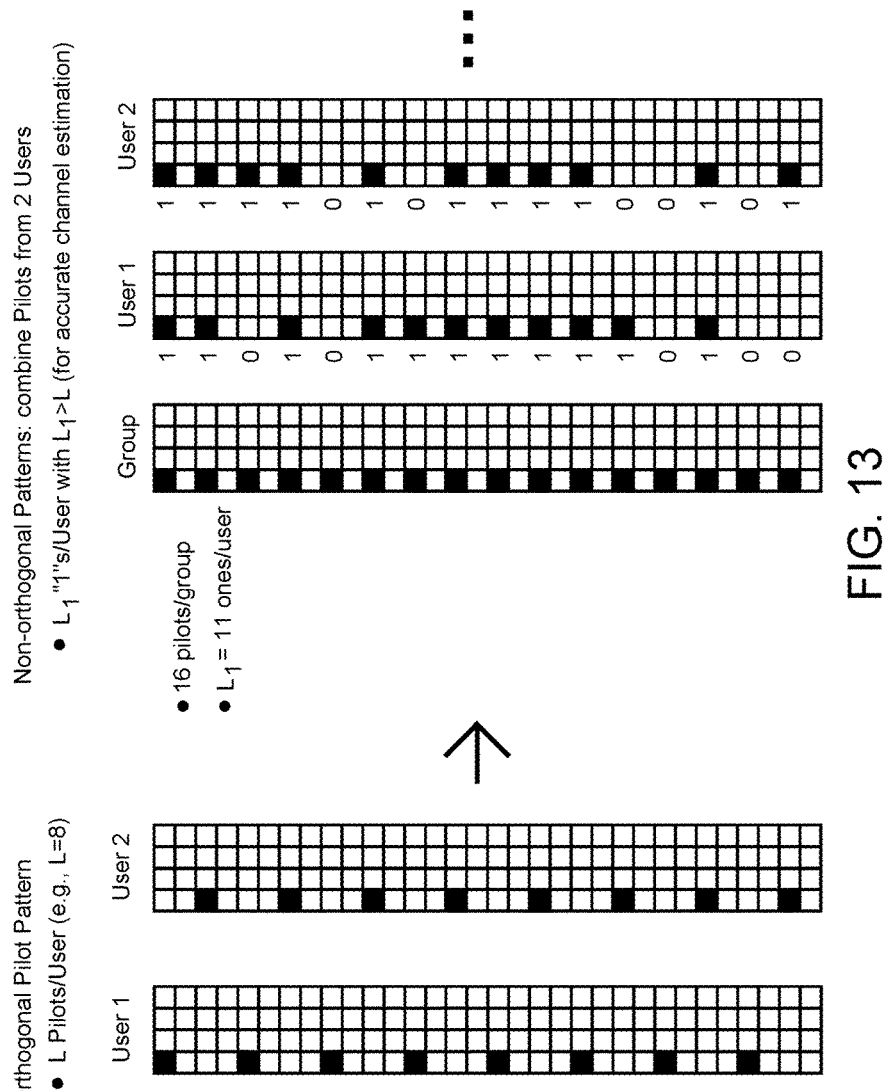
FIG. 13 illustrates the transition from an orthogonal pilot pattern in which there are L pilots per user.

FIG. 13 illustrates the transition from an orthogonal pilot pattern in which there are L pilots per user. In one embodiment, in the example, L equals 8. This orthogonal pilot pattern can be converted to a non-orthogonal pattern in which the pilots from two (or more) users are combined. In one case, there are sixteen pilots per group and both UTs are able to transmit using the same pilot dimensions. As shown, both UT 1 and UT 2 use the same resource blocks to transmit. However, in order to provide for accurate channel estimation, the number is used in the non-orthogonal pattern is greater than the number of pilots per user using the orthogonal pilot pattern. Therefore, in the example given, the preassigned codes are assigned to UT 1 and UT 2 and the number of 1's is equal to 11 per user (with 5 0's per user), which is greater than the 8 pilots per user in the example of the orthogonal pilot pattern.

Embodiments with RRHs with Directional Antennas Per Site

The techniques described herein are applicable to wireless systems with base stations that employ virtual sector-based processing according to which, user-channel estimation and data transmission are performed in parallel over non-overlapping angular sectors. Below, a single-cell scenario involving a single base station (BS) with a massive array serving multi-antenna terminals in the downlink of a mmWave channel is described. Note that the techniques disclosed herein are not limited to such a wireless communication system.

As discussed above, in one embodiment, the uplink training schemes are non-orthogonal, that is, the schemes allow multiple users to transmit pilots on the same pilot dimension (thereby potentially interfering with one another). Elementary processing allows each sector to determine the subset of user channels that can be resolved on the sector (with insignificant pilot contamination) and, thus, the subset of users that can be served by the sector. This allows resolving multiple users on the same pilot dimension at different sectors, thereby increasing the overall multiplexing gains of the system.

In one embodiment, a combination of non-orthogonal UL training from the user terminals based on pilot designs such as those described above and sector-based processing and precoding from the base station with a goal to increase aggregate spatial multiplexing gains and user rates. The challenge with two UTs transmitting pilots on the same pilot dimension is pilot contamination. Pilot contamination can substantially limit massive MIMO performance, as the beam used to send data (and therefore beamforming) to one UT, also beamforms unintentionally at the other (contaminating) user terminal.

In one embodiment, multiple UTs are scheduled to transmit pilots on the same pilot dimension, thereby increasing the number of UTs simultaneously transmitting pilots for training. In one embodiment, the presence of a massive uniform linear array (ULA) at the BS and a form of pre-sectorization in the AoA domain are exploited. Elementary processing at each sector allows determining the subset of UT channels that can be resolved on the sector, effectively pilot contamination free. Each sector then serves only the subset of UTs whose channels it can resolve. This allows resolving multiple users on the same pilot dimension at different sectors, thereby increasing the overall multiplexing gains of the system. Note that straightforward generalizations of the techniques described here in the context of ULAs can be applied to massive uniform patch arrays (UPA) at the BS. A UPA comprises a patch of antenna elements that are uniformly spaced horizontally and vertically and enable the BS to resolve user channels both in azimuth and elevation. Indeed similar pre-sectorization can be applied to resolve user channels in the Cartesian product of azimuth AoA domain and elevation AoA domain (i.e., for each combination of azimuth AoA and elevation AoA).

DL MU-MIMO Precoding

A number of DL precoding schemes are described below. In one embodiment, wideband scheduling is used, according to which a scheduling slot comprises Q>1 concurrent fading blocks, and ti denotes the number of available orthogonal pilot dimensions per fading block. Each fading block can be viewed as spanning a contiguous set of time-frequency elements in the OFDM plane that are within the coherence bandwidth and time of the user channels. Since the fading blocks in a slot are concurrent (i.e., distinct fading blocks span distinct subbands over the same set of OFDM symbols), the fading blocks in a slot are indexed using a fading-block frequency index $f \in \{1, 2, \ldots, Q\}$. With this interpretation $g_{s,k}(f)$ below corresponds to the channel of user k in sector s and fading block f:

$$g_{s,k}(f) = F_s^H h_k(f)$$

where the M×g matrix $F_s$ comprises the s-th set of g consecutive columns of F. It is worth remarking that, since the entries of $g_k(f)$ are uncorrelated ($\mathbb{E}[g_k(f)g_k^H(f)] = \Lambda_k$), in this way the M×1 channel vector between a single BS and a user is turned into S orthogonal g×1 sector channels with uncorrelated entries. It is assumed that L users (out of the total of $K_{tot}$ users served by the BS) are scheduled (in round robin fashion) per slot by the BS. In the context of the baseline orthogonal training scheme, the BS schedules L=τ UTs per scheduling slot for UL pilot transmission. Thus τ UTs send orthogonal pilots on each fading block, one UT/pilot dimension (K=1). In the context of the non-orthogonal UL training schemes, in one embodiment, the BS schedules L=$K_τ$ UTs per slot for some K>1. Hence, K>1 UT send pilots per pilot dimension. The notation $\sigma_k$ is used to denote the pilot dimension used by user k, and $K_\sigma$ is used to denote the indices of users assigned to pilot dimension a for $1 \leq \sigma \leq \tau$.

Figure 14:
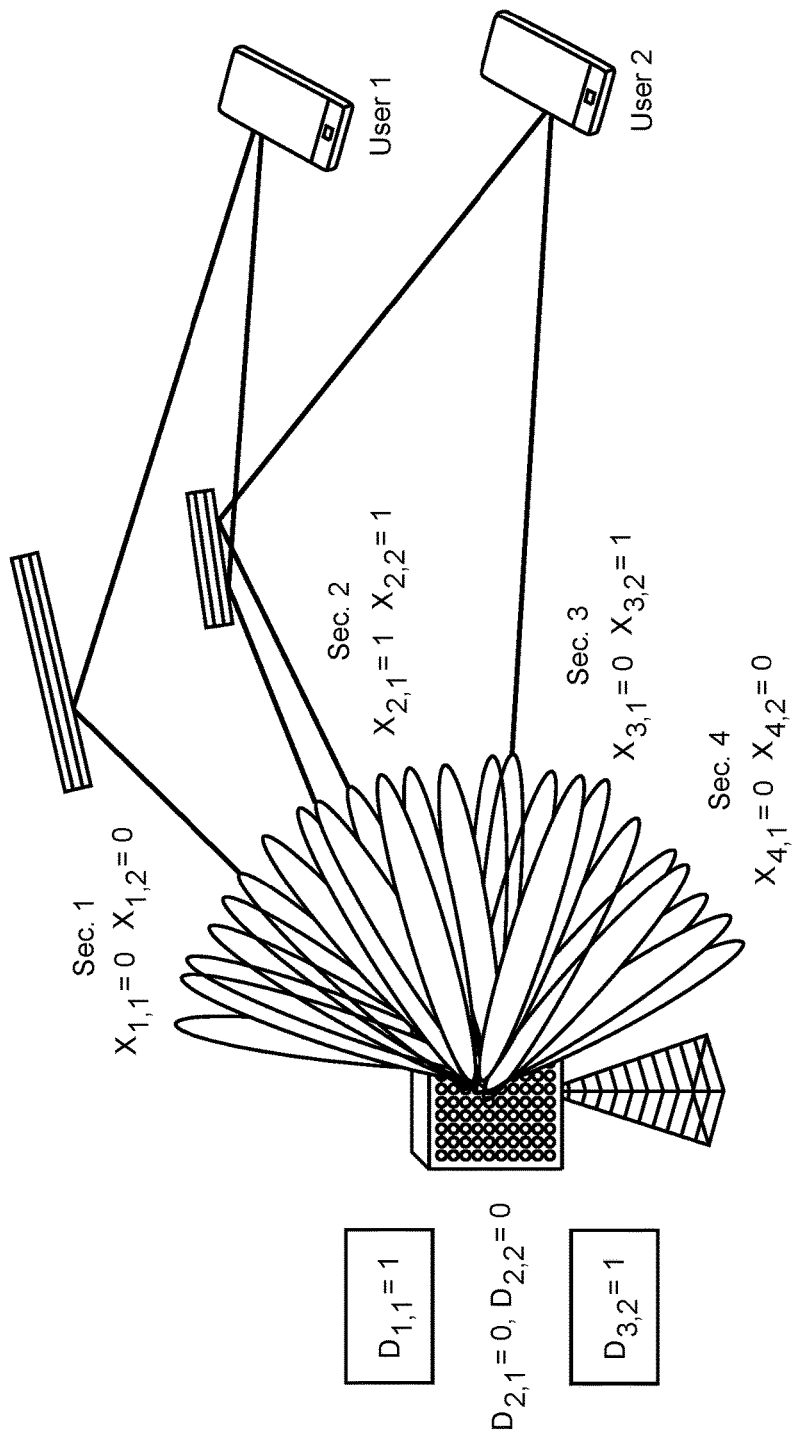
FIG. 14 illustrates an example of applying the proximity detection techniques to sectorization in order to determine whether or not the two user channels transmitting pilots on identical pilot dimensions can be resolved on each of the first four sectors of a base station.

In one embodiment, DL transmission occurs over a generic slot, and it is assumed without loss of generality that the scheduled UTs have indices from 1 to L. Assuming user k uses the same beam $b=b_k$ for UL pilot transmission and as a receive front-end in the downlink MIMO phase, the received signal at user k over one channel use within fading block f is given by $$r_k = \sqrt{\rho_d} x^T(f) h_k(f) + n_k \quad (2)$$

where x is the precoded signal, and where $n_k$ represents, for example, independent and identically distributed (IID) noise with $n_k \sim CN(0,1)$ and $\rho_d$ is the downlink SNR. In the MU-MIMO schemes, in one embodiment, precoding is sector based. In particular, based on UL training, each sector resolves the channels of a subset of the L users and serves them simultaneously. Letting $$X_{s,k} = 1_{[\tau, \infty]}(\overline{\lambda}_{s,k}) \quad (3)$$

denote whether or not user k is present on sector s and $$X_s = \{k : X_{s,k} = 1\} \quad (4)$$

denote the set of all users that are present in sector s. In the precoding schemes of interest, in one embodiment, a user k will be considered resolved on sector s (and will be served by a sector s) if and only if $X_{s,k}=1$ and there is no other user k' sharing the same dimension as user k and for which $X_{s,k'}=1$. Specifically, $D_{s,k}$ denotes whether or not user k's channel can be resolved on sector s:

$$D_{s,k} = X_{s,k} \left[ \prod_{k' \in K_{\sigma_k} \setminus \{k\}} (1 - X_{s,k'}) \right] \quad (5)$$

and $$D_s = \{k; D_{s,k} = 1\} \quad (6)$$

be the subset of present users whose channels are resolvable in sector s. FIG. 14 shows an example, involving two users using a common pilot dimension, a base station and four of its sectors, and two scatterers. As FIG. 14 reveals, user 1 is present in sectors 1 and 2, while user 2 is present in sectors 2 and 3. As a result, the channel of user 1 is resolvable in sector 1, the channel of user 2 is resolvable in sector 3, and neither user channel is resolvable in sector 2 or 4.

In general, not all present users are resolvable and thus $D_s \subseteq X_s$. Indeed, as inspection of equation (5) reveals if there are two users k and k' present in sector s (i.e., $X_{s,k}=X_{s,k'}=1$) that use the same pilot dimension (i.e., with $\sigma_k=\sigma_{k'}$), then $D_{s,k}=D_{s,k'}=0$. This is consistent with the fact that neither channel can be resolved due to the pilot collision. The number of sectors that can resolve (and thus will serve) user k is hence given by $A=\pi r^2$ $$N_k = \sum_{s=1}^{S} D_{s,k}, \quad (7)$$

while the number of users that are actually served in the slot is given by $$L' = |\{k; N_k > 0\}|$$

and, in general, $L' \leq L$.

In one embodiment, a particular form of linear zero-forced beam-forming is used. In one embodiment, all L' users are given equal power, that is, power $\rho_d/L'$. Furthermore, for any served user k, its power is equally split across all sectors that resolved the user's channel. Hence, the k-th user's stream receives power $\rho_d/(L'N_k)$ from each sector that serves the user. The precoded vector signal transmitted by the BS is given by 1×M vector $$u^T(f) = \sum_{s=1}^{S} u^T(f) V_s^H(f) F_s^H$$

where $u^T=[u_1 \ u_2 \ \ldots \ u_L]$ is the information bearing signal with $u_k \sim CN(0,1)$, and $$V_s(f) = [v_{s,1}(f) v_{s,2}(f) \ldots v_{s,L}(f)]$$

denotes the L×g precoder at sector s and fading block f. In particular, $v_{s,k}(f)=0$ for any $k \notin D_s$. For any $k \notin D_s$, $v_{s,k}(f)$ is in the direction of the unit-norm vector that is zero-forced to all other resolvable user-sector channel estimates, i.e., to $\{\hat{g}_{s,k'}(f); k' \in D_s \setminus \{k\}\}$ where $\{\hat{g}_{s,k}\}$'s denote the estimates of $\{\hat{g}_{s,k}\}$'s. Also $\|v_{s,k}(f)\|^2 = 1/(L'N_k)$. Note that with this type of precoding, $V_s(f)$ is invariant to any scalar (and complex) scaling of any of the $\hat{g}_{s,k}(f)$, for $k \in D_s$.

Substituting the expression for x(f) described below in equation (2), and using the fact that $h_k(f)=F \ g_k(f)$, the following is obtained:

$$r_k = \sqrt{p_d} \sum_{s=1}^{S} u^T(f) V_s^H(f) g_{s,k} + n_k.$$

(All L users are given equal power, that is, power $\rho_d/L$. Focusing on a single fading block f, the received signal at user $k \in \{1, \ldots, L\}$ is given by equation (2), where $x^T(f)$ is the precoded vector signal of size 1×M transmitted by the BS.

$$x^T(f) = u^T(f) V$$

where $u^T = [u_1 \ u_2 \ \ldots \ u_L]$ is the information bearing signal with $u_k \sim CN(0, 1)$ and $V(f) = [v_1(f) \ v_2(f) \ \ldots \ v_L(f)]$ denotes the L×_M precoder at fading block f.)

Training, Resolvable Channels and Performance Metrics

Orthogonal and non-orthogonal uplink training and its implications on user channel resolvability are described below. In one embodiment, each scheduled user k for $1 \leq k \leq L$ is scheduled to transmit pilots on pilot dimension $\sigma_k$, that is, one of the τ pilot dimensions. Each pilot dimension comprises Q resource elements, one per fading block. Letting $p_k = [p_k(1) \ p_k(2) \ \ldots \ p_k(Q)]^T$ denote the uplink pilot vector transmitted by user k, with $p_k(f)$ denoting the pilot value used by user k on fading block f.

The received signal by the BS array which is based on the pilots transmitted by the user set $K_\sigma$ on the pilot dimension a in fading block f is given by $$y_\sigma^{ul}(f) = \sqrt{P_p} \sum_{k \in K_\sigma} h_k(f) p_k(f) + w_\sigma^{ul}(f), \quad (10)$$

where $y_\sigma^{ul}(f)$ is the received vector of length M, $P_p$ is the uplink SNR, and the noise $w_\sigma^{ul}$ is IID CN (0, I). The corresponding s-th sector observations are given by projecting $y_\sigma^{ul}(f)$ onto $F_s$ $$\bar{y}_{s,\sigma}(f) = F_s^H y_\sigma^{ul}(f) = \sqrt{P_p} \sum_{k \in K_\sigma} p_k(f) g_{s,k}(f) + \bar{w}_{s,\sigma}^{ul}, \quad (11)$$

where $\bar{w}_{s,\sigma}^{ul} = F_s^H w_\sigma^{ul} \sim CN(0, I)$, since $F_s^H F_s = I$.

A. Orthogonal Training

In the orthogonal training setting, user k for $1 \leq k \leq z$ transmits pilots on the dedicated pilot dimension $\sigma_k = k$ (i.e., $K_\sigma = \{\sigma\}$), and, as a result, there is no user k' for which $\sigma_k = \sigma_{k'}$. Assuming also, without loss of generality, that $p_k(f) = 1$, the associated received signal in fading block f by the BS array based on the pilot transmitted by user k on the pilot dimension k (since $\sigma_k = k$) from equation (10) is given by $$y_k^{ul}(f) = \sqrt{P_p} h_k(f) + w^{ul}(f),$$

while the corresponding s-th sector observations are given by $$\bar{y}_{s,k}(f) = \sqrt{P_p} g_{s,k}(f) + \bar{w}_{s,k}^{ul}.$$

The precoder uses the following estimate of the k-th user's instantaneous channel on fading block f and sector s:

$$\hat{g}_{s,k}(f) = \hat{y}_{s,k}(f) \quad (14)$$

Note that this estimate does not make any use of the pilot SNR, and does not rely on knowledge of $\bar{\lambda}_{s,k}$.

Inspection of equation (5) reveals, that in the orthogonal scheme, $X_{s,k} = D_{s,k}$, as there is no user k' for which $\sigma_k = \sigma_{k'}$. That is, in the orthogonal scheme, a sector can resolve the channel of user k if a user is present in sector s (i.e., $\bar{\lambda}_{s,k,\geq\gamma}$), and thus $X_s = D_s$. Subsequently, the sector s forms $V_s(f)$ for its resolvable user set $D_s$ according to (73) and using $\hat{g}_{s,k}(f)$ from (14) for all $k \in D_s$.

Practical detection schemes for detecting the set of user channels that are resolvable can be readily devised by exploiting the key fact that $$\mathbb{E}[g_{s,k}(f)g_{s,k}^H(f)] = \text{diag}(\lambda_{(s-1)g+1,k}, \lambda_{(s-1)g+2,k}, \lambda_{sg,k})$$

for each fading block f in the slot. Noting also that $$\mathbb{E}[\|\bar{y}_{s,k}(f)\|^2] = \mathbb{E}[\hat{y}_{s,k}(f)^H \bar{y}_{s,k}(f)]$$
$$= tr(\mathbb{E}[\bar{y}_{s,k}(f)\bar{y}_{s,k}(f)^H])$$
$$= g(\rho_p \bar{\lambda}_{s,k} + 1).$$

Simple practical detection schemes can be devised that benefit from averaging both over the g beams and the Q tones, e.g.:

$$\frac{1}{Q\rho_p g} \sum_{f=1}^{Q} \|\bar{y}_{s,k}(f)\|^2 - \frac{1}{\rho_p} \begin{matrix} \hat{D}_{s,k=1} \\ > \\ < \\ \hat{D}_{s,k=0} \end{matrix} \gamma.$$

The notation above is meant to imply that the detector chooses $\hat{D}_{s,k=1}$ if the left-hand side exceeds the right hand side (i.e., $\gamma$), and $\hat{D}_{s,k=0}$ otherwise. If $\hat{D}_{s,k=1}$, then user k's channel on sector s is considered to be resolvable by the BS based on received uplink signal.

B. Non-Orthogonal Training

In the non-orthogonal training setting, in one embodiment, K>1 users pilots are aligned to use a single pilot dimension. As a result, the non-orthogonal scheme splits the $L = K_\tau$ scheduled users uniformly across the $K_\sigma$ sets, so that $|K_\sigma| = K$ for each $\sigma \in \{1, 2, \ldots, \tau\}$. Note that, given $X_s$, the set of present users in sector s, the number of detected and served users from sector s, $D_s$, is given by equation (6) and in general satisfies $D_s \subseteq X_s$. For example, if there is a $\sigma$ for which multiple users are present in sector s, i.e., $|X_s \cap D_\sigma| > 1$ then $D_s \subset X_s$. Such situation would correspond to a collision, that is, two or more users using the same pilot dimension are present in sector s, in which case, neither one's channel is resolvable for transmission.

Given the set of users with resolvable channels in sector s, that is, given $D_s$, sector s forms $V_s(f)$ according to that described below and using $$\hat{g}_{s,k}(f) = \bar{y}_{s,\sigma_k}(f)$$

for all $k \in D_s$, and where $\bar{y}_{s,\sigma}(f)$ is given by (11). (All L users are given equal power, that is, power $\rho_d/L$. Focusing on a single fading block f, the received signal at user $k \in \{1, \ldots, L\}$ is given by equation (2), where $x^T(f)$ is the precoded vector signal of size $1 \times M$ transmitted by the BS.

$$x^T(f) = u^T(f)V$$

where $u^T = [u_1 \ u_2 \ \ldots \ u_L]$ is the information bearing signal with $u_k \sim \mathcal{CN}(0, 1)$ and $$V(f) = [v_1(f) v_2(f) \ldots v_L(f)]$$

denotes the $L \times M$ precoder at fading block f.)

Practical detection schemes that detect which user channels are resolvable in a sector can be also readily devised. Noting that $$\mathbb{E}_I[\|\bar{y}_{s,\sigma}(f)\|^2] = g(P_p \sum_{k \in K_\sigma} \bar{\lambda}_{s,k} |p_k(f)|^2 + 1)),$$

and assuming a sufficiently large number of beams per sector, g, the RHS of (IV-B) can be approximated $\|\bar{y}_{s,\sigma}(f)\|^2$. This suggests that a system of Q linear equations (one per fading block on pilot dimension $\sigma$) can be used to obtain $\{\bar{\lambda}_{s,k}; k \in K_\sigma\}$'s. Letting, $$r_{s,\sigma} = [\|\bar{y}_{s,\sigma}(1)\|^2 \|\bar{y}_{s,\sigma}(2)\|^2 \ldots \|\bar{y}_{s,\sigma}(Q)\|^2]^T$$

there is a system of equations $$r_{s,\sigma} = g P_p P_\sigma \bar{\lambda}_{s,\sigma} + g1 + \text{noise}$$

where $\bar{\lambda}_{s,\sigma}$ is a $K \times 1$ matrix whose entries comprise the set $\{\bar{\lambda}_{s,k}; k \in K_\sigma\}$, and where row f of the $Q \times K$ matrix $P_\sigma$ contains the associated $|p_k(f)|^2$ entries. For each k in $K_\sigma$, let also $i_k$ denote the index i for which $[\bar{\lambda}_{s,\sigma}]_i = \bar{\lambda}_{s,k}$. If $Q \geq K$, the set of $\{p_k(f); k \in K_\sigma, 1 \leq f \leq Q\}$ can be chosen a priori so that $P_\sigma$ has full column rank, and hence the presence of each user can be individually detected. One such simple detector of the presence of user k is given by $$\frac{1}{P_p g} e_{i_k}^T A_\sigma r_{s,\sigma} - \frac{1}{P_p} e_{i_k}^T \delta_\sigma \begin{matrix} \hat{X}_{s,k=1} \\ > \\ < \\ \hat{X}_{s,k=0} \end{matrix} \gamma$$

where $A_\sigma = (P_\sigma^H P_\sigma)^{-1} P_\sigma^H$, and $\delta_\sigma = A_\sigma 1$ and where $e_n^T$ is the $n^{th}$ column of the $K \times K$ identity matrix. Note that both $A_\sigma$ and $\delta_\sigma$ are independent of the user channels and can be computed offline. Subsequently user channel resolvability can be detected by substituting $\hat{X}_{s,m}$ for $X_{s,m}$ in equation (5):

$$\hat{D}_{s,k} = \hat{X}_{s,k} \left[ \prod_{k' \in K_{\sigma_k} \setminus \{k\}} (1 - \hat{X}_{s,k'}) \right].$$

Note that a variety of codes can be designed, which result in $P_\sigma$ having full column rank. Indeed, $P_\sigma$ codes with full column rank can be designed with $Q \geq K$ even with $p_k(f)$ restricted to take $\{0,1\}$ values that are dense in the number of ones. However, note that that the requirement that $P_\sigma$ be full column rank is not necessary for detecting the resolvable user channels. Indeed, there are zero-one codes for cases where $Q < K$ together and simple detection schemes, that is schemes for detecting which user channels are resolvable.

Note that aligning the same set of users on the same set of pilot dimensions across a set of concurrent slots is attractive due to the simplicity of operation it offers and the fact that it allows "aligning" the users so that their pilots interfere in subsets. Note also that other embodiments include active-user pilot interference that is aligned in arbitrary ways. One example corresponds to assigning a set of B>1 pilot dimensions per resource block to the same set of active users over N ports. Assuming a user terminal with (at least) B transmit antennas, B uplink pilot dimensions allocated to an active user terminal within a slot would allow serving the terminal with up to B streams per slots. In this design however the length over which the pilot code can be designed is NB pilot dimensions. For example, consider scheduling L users over B=2 pilot dimensions per slot, over N=6 concurrent slots. Given that NB=12 pilot dimensions over which the code is defined, from the Table in FIG. 8 it is shown that up to L=66 active users can be supported with efficiency ⅚ over 6 concurrent scheduling slots. Other embodiments where, for example, at least one active user is only active on a subset B'<B of the allocated pilot dimensions over the N slots can be considered. Upon proximity detection at each RRH unit (or RRH sector site), if a single active UT is detected among those transmitting a pilot on the given pilot dimension, then the RRH unit (or RRH sector site) can serve the detected user its packet(s).

Finally, the pilot-code based proximity detection mechanisms disclosed herein can be also combined with a broad range of channel estimation algorithms based on uplink pilot transmission to allow enhancing the multiplexing gains achieved in a variety of wireless transmission scenarios over a broad range of carrier frequencies. In one embodiment, involving cellular transmission over mmWave channels, pilot codes can be combined with pseudorandom pilot allocation over the OFDM plane and compressed sensing and channel estimation. In the baseline compressed sensing scenario, a set of users are allocated each a subset of pseudo-randomly chosen time-frequency elements in the first few OFDM symbols of a DL training and DL data transmission slot. By exploiting the fact that channel response of each user (with respect to a given BS site) is sparse in angle of arrival (AoA), angle of departure (AoD) and multipath spread, compressed sensing channel estimation algorithms can realize significant savings in terms of the number of training dimensions per user that are required to estimate each user channel. Let D denote the number of pilot dimensions required per user to estimate a user channel within a scheduling slot in such a scenario. With the codes of the type of FIG. 1, using N=D+1 training dimensions allows multiplexing up to L=D+1 users on the same set of training dimensions. Upon detecting a single user in proximity of the BS with the pilot-codes and mechanisms disclosed herein, the D (out of the D+1 training dimensions) on which the user has transmitted a pilot allow estimating the user channel response. Similarly, pilot codes with m zeros and D=N-m ones may be used. This requires allows multiplexing up to $$L = \binom{D+m}{m}$$

users on the same set of N=D+m training dimensions. The code structure allows not only the detection of the user in proximity (when a single user is in proximity), but also estimation of the user channel (based on the D non-zero pilots transmitted by the user over the D+m training dimensions).

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A wireless system for use in a wireless network having a plurality of user terminals (UTs), wherein at least two UTs of the plurality of UTs have pre-assigned user uplink pilot codes and are allocated common pilot resources over at least two concurrent slots, the system comprising:
   a UT-proximity detection processor coupled to the receiver to determine which UT channels the UT-proximity detection processor can resolve among a group of UTs transmitting pilots in identical pilot resources, the UT-proximity detection processor operable to resolve a UT channel of a UT by determining the UT is in proximity of the system and no other UT in the group of UTs transmitting pilots that has transmitted a pilot on the identical pilot resources is in proximity of the system.

2. The wireless system defined in claim 1 wherein the UT-proximity detection processor is operable to determine an identity of the UT determined to be in proximity of the system when no other UT in the group of UTs transmitting pilots that has transmitted a pilot on the identical pilot resources is in proximity of the system.

3. The wireless system defined in claim 1 wherein the pilot resources are time-frequency elements.

4. The wireless system defined in claim 1 further comprising a scheduler operable to serve only that subset of UT channels resolved by the UT-proximity detection processor by scheduling transmissions to a UT associated with each UT channel in the subset of UT channels.

5. The system defined in claim 1 wherein at least two UTs share two distinct pilot resources, and at least one of the UTs transmits pilots at two different pilot powers over two of the pilot resources.

6. The system defined in claim 5 wherein one of the two different pilot powers is zero.

7. The system defined in claim 1 where the UT-proximity detection processor is operable to determine UT proximity using the pre-assigned user pilot codes and the received signal energy observations across a site antenna array of the system for the identical pilot resources used for pilot transmission by the at least two UTs.

8. The system defined in claim 7 wherein the UT-proximity detection processor thresholds each observation in a set of the received signal energy observations of uplink pilot transmissions received from UTs to generate an ordered set of data and then compares the ordered set of data to pre-assigned user pilot codes to determine if a match exists.

9. The system defined in claim 7 wherein the pre-assigned user pilot codes are non-orthogonal codes.

10. The system defined in claim 7 wherein the preassigned codes comprise a first number of zeros and a second number of ones, where the first and second numbers are different, and further wherein the UT-proximity detection processor compares received energy levels associated with pilot transmissions with the preassigned codes to determine if a collision has occurred and the identity of the UT if no collision has occurred.

11. The system defined in claim 1 wherein the UT-proximity detection processor is operable to perform proximity detection where reception of pilot transmissions comprises a plurality of sector observations from UTs in sectors that are converted into an indication of received pilot energy in a sector, the UT-proximity detection processor being operable to threshold the received pilot energy and compare results of thresholding with uplink pilot codes to determine if a UT is the only active UT in proximity to the wireless system.

12. The system defined in claim 1 wherein the system is part of a remote radio head (RRH) site or a base station.

13. A method for uplink pilot reuse in a wireless network, the method comprising:
    receiving, at a wireless system, uplink pilot transmissions from one or more user terminals (UTs) of a plurality of UTs transmitting pilots, wherein at least two UTs in the plurality of UTs are allocated common pilot resources over at least two concurrent slots;
    determining, by a UT-proximity detection processor, which UT channels can be resolved among a group of UTs transmitting pilots in identical pilot resources by determining that a UT is in proximity of the system and no other UT that has transmitted a pilot on the identical pilot resources is in proximity of the system.

14. The method defined in claim 13 further comprising determining an identity of the UT determined to be in proximity of the system when no other UT in the plurality of UTs transmitting pilots that has transmitted a pilot on the identical pilot resources is in proximity of the system.

15. The method defined in claim 13 wherein the pilot resources are time-frequency elements.

16. The method defined in claim 13 further comprising serving only that subset of UT channels resolved by the UT-proximity detection processor by scheduling transmissions to a UT associated with each UT channel in the subset of UT channels.

17. The method defined in claim 13 further comprising:
    sharing, by at least two UTs, two distinct pilot resources; and
    transmitting, by the at least two UTs, pilots with different pilot powers over two of the pilot resources.

18. The method defined in claim 17 wherein one of the two different pilot powers is zero.

19. The method defined in claim 13 further comprising
    detecting, based on received uplink pilot transmissions, at least two active UTs transmitting pilots on identical pilot resources are in proximity of the wireless system, including detecting a collision between uplink pilot transmissions of the at least two active UTs; and
    determining, by the wireless system, not to send data to either of the at least two active UTs in response detecting the at least two active UTs are in proximity of the wireless system.

20. The method defined in claim 13 further comprising scheduling transmissions to UTs resolved by the system by determining that each of the UTs is in proximity of the system and no other UT that has transmitted a pilot on the identical pilot resources is in proximity of the system.

21. The method defined in claim 13 further comprising determining UT proximity using the pre-assigned user pilot codes and the received signal energy observations across a site antenna array of the system for the identical pilot resources used for pilot transmission by the at least two UTs.

22. The method defined in claim 21 further comprising thresholding each observation in a set of the received signal energy observations of uplink pilot transmissions received from UTs to generate an ordered set of data and then compares the ordered set of data to pre-assigned user pilot codes to determine if a match exists.

23. The method defined in claim 22 wherein the pre-assigned user pilot codes are non-orthogonal codes.

24. The method defined in claim 13 wherein the preassigned codes comprise a first number of zeros and a second number of ones, where the first and second numbers are different, and further comprising comparing received energy levels associated with pilot transmissions with the preassigned codes to determine if a collision has occurred and an identity of the UT if no collision has occurred.

25. The method defined in claim 13 wherein the wireless system comprises a remote radio head (RRH) site or a base station.

26. A wireless communication system comprising:
    a plurality of UTs, wherein at least two UTs of the plurality of UTs have pre-assigned user uplink pilot codes and are allocated common pilot resources over at least two concurrent slots;
    a plurality of wireless sites, wherein at least one wireless site comprises
        a UT-proximity detection processor coupled to a receiver to determine which UT channels the UT-proximity detection processor can resolve among a group of UTs transmitting pilots in identical pilot resources, the UT-proximity detection processor operable to resolve a UT channel of a UT by determining the UT is in proximity of the system and no other UT in the group of UTs transmitting pilots that has transmitted a pilot on the identical pilot resources is in proximity of the system.

27. The wireless communication system defined in claim 26 wherein the UT-proximity detection processor is operable to determine an identity of the UT determined to be in proximity of the system when no other UT in the group of UTs transmitting pilots that has transmitted a pilot on the identical pilot resources is in proximity of the system.

28. The wireless communication system defined in claim 26 wherein the pilot resources are time-frequency elements.

29. The wireless communication system defined in claim 26 further comprising a scheduler operable to serve only that subset of UT channels resolved by the UT-proximity detection processor by scheduling transmissions to a UT associated with each UT channel in the subset of UT channels.

30. The wireless communication system defined in claim 26 wherein at least two UTs share two distinct pilot resources, and at least one of the UTs transmits pilots at two different pilot powers over two of the pilot resources.

31. The wireless communication system defined in claim 26 wherein one of the two different pilot powers is zero.

* * * * *